(12) United States Patent
Jubran et al.

(10) Patent No.: US 9,641,394 B2
(45) Date of Patent: May 2, 2017

(54) AUTOMATED BUILD-OUT OF A CLOUD-COMPUTING STAMP

(75) Inventors: Marwan E. Jubran, Redmond, WA (US); Aleksandr Gershaft, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 488 days.

(21) Appl. No.: 13/360,876

(22) Filed: Jan. 30, 2012

(65) Prior Publication Data

US 2013/0198346 A1    Aug. 1, 2013

(51) Int. Cl.
*H04L 12/24*    (2006.01)

(52) U.S. Cl.
CPC .......... *H04L 41/12* (2013.01); *H04L 41/0853* (2013.01); *Y04S 40/162* (2013.01); *Y04S 40/164* (2013.01)

(58) Field of Classification Search
CPC .... H04L 41/12; H04L 41/0853; Y04S 40/162; Y04S 40/164
USPC .................................................. 709/220, 224
See application file for complete search history.

(56) References Cited

U.S. PATENT DOCUMENTS

| | | | |
|---|---|---|---|
| 7,493,653 B2 * | 2/2009 | Klein | ................. H04L 41/0843 709/222 |
| 7,746,860 B2 | 6/2010 | Tams et al. | |
| 8,549,869 B1 | 10/2013 | Whitted | |

(Continued)

FOREIGN PATENT DOCUMENTS

| | | |
|---|---|---|
| EP | 1250785 | 8/2007 |
| EP | 2339778 A1 | 6/2011 |

(Continued)

OTHER PUBLICATIONS

Final Office Action in U.S. Appl. No. 13/531,136, mailed Jan. 13, 2014, 27 pages.

(Continued)

*Primary Examiner* — Philip Chea
*Assistant Examiner* — Mohammed Ahmed
(74) *Attorney, Agent, or Firm* — Shook, Hardy & Bacon L.L.P.

(57) ABSTRACT

Methods, systems, and computer-readable media for automatically configuring an inventory of hardware to interact seamlessly with a cloud-computing fabric of a data center are provided. Initially, hardware devices within the hardware inventory are located by sending and receiving communications to network devices via serial-based connections and network-based connections, respectively. Information collected during hardware-device location is cross-referenced against a template file for purposes of validation. This information is also employed to generate an infrastructure state of the hardware inventory. The infrastructure state is shared with a controller of the fabric to integrate the hardware inventory therein. Upon integration, services and security measures are provisioned on the hardware inventory, which is designated as a fabric-computing cluster of the data center in order to extend reachability of the fabric, while distributed services are deployed and enabled on available portions of the hardware inventory, which are managed by the fabric controller.

20 Claims, 7 Drawing Sheets

(56) References Cited

U.S. PATENT DOCUMENTS

| | | | |
|---|---|---|---|
| 8,625,596 B1* | 1/2014 | Thomas | H04L 41/12 370/351 |
| 8,949,389 B1 | 2/2015 | Rimmer | |
| 2002/0163901 A1 | 11/2002 | Spratt | |
| 2005/0060413 A1* | 3/2005 | Oyadomari | H04L 12/2697 709/227 |
| 2005/0182601 A1* | 8/2005 | Deguchi | G06N 5/025 703/1 |
| 2005/0216732 A1 | 9/2005 | Kipnis et al. | |
| 2006/0094291 A1* | 5/2006 | Caveney | H01R 13/641 439/540.1 |
| 2006/0282529 A1* | 12/2006 | Nordin | H04L 43/0811 709/224 |
| 2007/0005994 A1* | 1/2007 | Bahali | G06F 1/3203 713/300 |
| 2007/0088630 A1* | 4/2007 | MacLeod | G06Q 10/087 705/28 |
| 2007/0180059 A1* | 8/2007 | Marl | G06Q 10/087 709/219 |
| 2008/0052437 A1* | 2/2008 | Loffink | G06F 1/189 710/302 |
| 2008/0259816 A1* | 10/2008 | Archer | G06F 17/509 370/254 |
| 2009/0210735 A1* | 8/2009 | Brown | G06F 1/26 713/330 |
| 2010/0036903 A1* | 2/2010 | Ahmad | H04L 67/1002 709/202 |
| 2010/0131948 A1* | 5/2010 | Ferris | G06F 9/50 718/1 |
| 2010/0153482 A1* | 6/2010 | Kim | G06F 8/61 709/201 |
| 2010/0211656 A1* | 8/2010 | Pagan | H04L 49/10 709/220 |
| 2010/0235484 A1* | 9/2010 | Bolan | G05B 23/0267 709/223 |
| 2011/0022245 A1* | 1/2011 | Goodrum | H04L 12/10 700/297 |
| 2011/0072255 A1* | 3/2011 | Gopalakrishnan | G06F 9/4416 713/2 |
| 2011/0078680 A1* | 3/2011 | Lagergren | G06F 9/5077 718/1 |
| 2011/0145392 A1* | 6/2011 | Dawson | G06F 9/5072 709/224 |
| 2011/0154123 A1 | 6/2011 | Barrall et al. | |
| 2011/0172841 A1 | 7/2011 | Forbes, Jr. | |
| 2011/0231822 A1* | 9/2011 | Sabin | G06F 11/3688 717/124 |
| 2011/0246793 A1* | 10/2011 | Davis | G06F 1/266 713/300 |
| 2011/0270962 A1* | 11/2011 | Tameshige | H04L 41/06 709/223 |
| 2011/0295633 A1* | 12/2011 | Bird | G06F 17/30601 705/7.11 |
| 2011/0296069 A1* | 12/2011 | Tarta | G06F 9/526 710/200 |
| 2011/0320849 A1* | 12/2011 | Cochran | G06F 1/26 713/340 |
| 2012/0102186 A1* | 4/2012 | Rewaskar | H04L 41/0816 709/224 |
| 2012/0151040 A1* | 6/2012 | Mouravyov | H04L 41/0859 709/224 |
| 2012/0170585 A1* | 7/2012 | Mehra | H04L 45/24 370/400 |
| 2012/0209981 A1* | 8/2012 | Bolan et al. | 709/223 |
| 2012/0297037 A1 | 11/2012 | Kumagai et al. | |
| 2012/0303767 A1* | 11/2012 | Renzin | H04L 41/08 709/220 |
| 2012/0311111 A1 | 12/2012 | Frew et al. | |
| 2013/0007737 A1 | 1/2013 | Oh et al. | |
| 2013/0046884 A1 | 2/2013 | Frost et al. | |
| 2013/0227136 A1* | 8/2013 | Sturgeon | G06F 1/206 709/224 |
| 2014/0039683 A1 | 2/2014 | Zimmermann et al. | |
| 2014/0068057 A1 | 3/2014 | Burchfield et al. | |
| 2014/0101467 A1 | 4/2014 | Jubran et al. | |
| 2014/0119238 A1* | 5/2014 | Thomas et al. | 370/254 |
| 2014/0173060 A1 | 6/2014 | Jubran et al. | |
| 2014/0298734 A1 | 10/2014 | Rogers | |

FOREIGN PATENT DOCUMENTS

| | | |
|---|---|---|
| EP | 2362578 A1 | 8/2011 |
| GB | 2421153 A | 6/2006 |
| JP | H0412353 A | 4/1992 |
| JP | 2004252800 A | 9/2004 |
| JP | 2007213271 A | 8/2007 |
| WO | 2010119370 A1 | 10/2010 |
| WO | 2011151773 A1 | 12/2011 |
| WO | WO 2011159842 | 12/2011 |

OTHER PUBLICATIONS

International Search Report and Written Opinion in PCT/US2013/046670, mailed Oct. 9, 2013, 10 pages.

International Search Report and Written Opinion in PCT/US2013/060244, mailed Feb. 4, 2014, 16 pages.

Hirschfeld, et al., "Bootstrapping OpenStack Clouds", Retrieved on: Jul. 20, 2011, 15 pages Available at: http://www.rackspace.com/downloads/pdfs/dell_tech_wp-bootstrapping_openstack_clouds.pdf.

"System Imaging", Retrieved on: Jul. 20, 2011, 2 pages Available at: http://itservices.stanford.edu/strategy/sysadmin/imaging.

Casado, et al., "Ripcord: A Modular Platform for Data Center Networking", In Proceedings of the ACM SIGCOMM 2010 conference on SIGCOMM, Jun. 7, 2010, 15 pages.

Mudigonda, et al., "NetLord: A Scalable Multi-tenant Network Architecture for Virtualized Datacenters", Published on: Aug. 15-19, 2011, 12 pages Available at: http://www.hpl.hp.com/personal/Praveen_Yalagandula/papers/SIGCOMM2011-NetLord.pdf.

"Just Released: StockTrader 5.0, Windows Azure Platform End-to-End Sample Application", Published on: Jun. 30, 2011, 1 page Available at: http://blogs.msdn.com/b/windowsazure/archive/2011/06/30/just-released-stocktrader-5-0-windows-azure-platform-end-to-end-sample-application.aspx.

"Bootstrapping Applications via AWS CloudFormation", Retrieved on: Dec. 28, 2011, 22 pages Available at: https://s3.amazonaws.com/cloudformation-examples/BoostrappingApplicationsWithAWSCloudFormation.pdf.

"Configuring the Hardware and Software Inventory SMS Feature", Retrieved on: Dec. 30, 2011, 6 pages Available at:http://www.tech-faq.com/configuring-the-hardware-and-software-inventory-sms-feature.html.

"Understanding Systems Management Server (SMS)", Retrieved on: Dec. 29, 2011, 11 pages, Available athttp://www.tech-faq.com/understanding-systems-management-server-sms.html.

"Vyatta Network OS for Cloud Computing", Retrieved on: Dec. 28, 2011, 3 pages Available at:http://www.vyatta.com/sites/vyatta.com/files/pdfs/vyatta_cloud_datasheet.pdf.

"Windows Azure Bootstrapper", Retrieved on: Dec. 28, 2011, 2, pages Available at:http://bootstrap.codeplex.com/.

Bourgeau, Paul, "Cloud Security: Managing the Cloud with Windows Intune", Published on: Jun. 2010, 6 pages, Available at:http://technet.microsoft.com/en-us/magazine/ff742836.aspx.

International Search Report and Written Opinion in PCT/US2013/022358, mailed Jun. 21, 2013.

Non Final Office Action in U.S. Appl. No. 13/531,136, mailed May 8, 2013.

Perera, et al., "A Scalable and Robust Coordination Architecture for Distributed Management", In Department of Computer Science Technical Report TR-659, Indiana University, 2008, 10 pages.

International Search Report & Written Opinion for PCT Patent Application No. PCT/US2013/074742, Mailed Date: Apr. 4, 2014, Filed Date: Dec. 12, 2013, 14 Pages.

Non-Final Office Action dated Jul. 31, 2014 in U.S. Appl. No. 13/531,136, 13 pages.

(56) References Cited

OTHER PUBLICATIONS

Non-Final Office Action dated Aug. 13, 2014 in U.S. Appl. No. 13/647,116, 29 pages.
Second Written Opinion of the International Searching Authority dated Dec. 19, 2014 in PCT Application No. PCT/US2013/074742, 10 pages.
Final Office Action dated Feb. 10, 2015 in U.S. Appl. No. 13/531,136, 15 pages.
Notice of Allowance dated Mar. 4, 2015 in U.S. Appl. No. 13/647,116, 9 pages.
International Preliminary Report on Patentability dated Mar. 23, 2015 in PCT Application No. PCT/US2013/074742, 18 Pages.
European Office Action dated Mar. 3, 2015 in Application No. 13734578.1, 2 pages.
Non-Final Office Action dated May 21, 2015 in U.S. Appl. No. 13/715,273, 12 pages.
"Supplementary Search Report Issued in European Patent Application No. 13743254.8", Mailed Date: May 29, 2015, 5 Pages.
European Office Action dated May 18, 2015 in European Patent Application No. 13771681.7, 2 pages.
Notice of Allowance dated Jan. 14, 2016 in U.S. Appl. No. 13/715,273, 5 pages.
International Search Report & Written Opinion Issued in PCT Application No. PCT/US2015/051291, Mailed Date: Oct. 23, 2015, 13 Pages.
StruxureWareTM Data Center Operation, Retrieved on: Jul. 4, 2014, Available at: http://www2.schneider-electric.com/documents/solutions/struxureware/StruxureWare-data-center-operation_RMCR-8N2PLE_R7_EN.pdf.
Non-Final Office Action dated Jan. 26, 2017 in U.S. Appl. No. 14/496,889, 16 pages.

* cited by examiner

AUTOMATED BUILD-OUT OF A CLOUD-COMPUTING STAMP

BACKGROUND

Generally, distributed service applications are hosted in cloud-computing networks (across various nodes) and are intended primarily to promote high availability through redundancy of service-application components, dynamic scalability, and auto-healing functionality. These service applications are often divided into portions that include a group of service-application components. These service-application components may be hosted throughout nodes (e.g., physical machines and virtual machines) of one or more data centers. Often, there exists a need to create or expand the computing/storage capacity of these data centers to accommodate usage demands of the service applications and to help ensure that an entire service application does not become unavailable due to a lack of support from the underlying hardware.

Expansion of the data centers may involve various scenarios, such as configuring a new set of hardware or reconfiguring an existing set of hardware to operate in concert with the existing nodes within the data centers. In one example, a new set of racks that each accommodates a plurality of blades may be targeted for being integrated within a fabric that interconnects the data center nodes. This fabric helps ensure that the service-application components distributed across the existing nodes and the newly added hardware such as racks, network devices (L2/3 switches, routers, load balancers), power and serial devices, and blades are able to interact as if each service application was running on its own independent computing device.

When conducting an expansion of a data center, the steps for integrating the new set of hardware into the fabric are presently manually conducted. These manually conducted steps are often time-consuming, ineffective, and inconsistent in result, thus, potentially leading to service interruptions within the fabric. Accordingly, an automated end-to-end process that builds out a set of designated hardware for deployment into a fabric would help achieve an efficient, robust, and scalable framework for expanding the computing/storage capacity of a data center.

SUMMARY

This Summary is provided to introduce concepts in a simplified form that are further described below in the Detailed Description. This Summary is not intended to identify key features or essential features of the claimed subject matter, nor is it intended to be used as an aid in determining the scope of the claimed subject matter.

Embodiments of the present invention relate to systems, methods, and computer storage media for carrying out an automated bootstrap process that verifies a physical topology of an inventory of nonconfigured hardware and integrates/deploys the hardware inventory as a fabric-computing cluster (FCC) within a cloud-computing fabric of a data center. The automated manner in which the bootstrap process is implemented avoids the problematic fallout (discussed above) that precipitates from manually executed procedures for reconfiguring or adding capacity to a data center. Accordingly, in embodiments of the present invention, the automated bootstrap process enables building out the hardware inventory and incorporating it into the cloud-computing fabric in a consistent and effective fashion.

In general, the bootstrap process is triggered upon receiving an indication to create or expand computing/storage capacity of a data center. In embodiments, the data center includes a plurality of nodes (e.g., physical machines or virtual machines), network devices, serial devices, power devices, and other equipment that are operably interconnected and managed via the cloud-computing fabric. The fabric provides underlying support for service applications that are distributed throughout the data centers. In particular, portions (e.g., roles instances or program components) of these service applications that are distributed throughout nodes may be managed by a controller of the fabric. The fabric controller is generally responsible for various duties surrounding the monitoring, maintenance and management of the health of computer resources, network gear, serial devices, and power units that support the underlying functionality of the fabric.

In an exemplary embodiment, the bootstrap process is performed in independent phases upon being triggered by an event (e.g., call to expand capacity of the data center). These phases are carried out by executing self-contained workflows, respectively, and are generally depicted at FIG. 2. Initially, a coauthoring phase may be conducted for specifying an initial set-up of an inventory of hardware. This phase involves a workflow for implementing one or more of the following processes: receiving a customer's dependency schema that specifies the additional capacity required on the customer's premises; identifying the hardware that meets the dependency schema; interfacing with the customer to gather values for configuring the identified hardware; generating a symbolic representation from the values; validating configuration using the symbolic representation upon delivery of the hardware; and preparing a template file that memorializes a layout of the topology.

Upon preparing the template file, the phases that involve discovery and validation of network devices and hardware devices may be commenced. The workflows for performing discovery and validation for each of these devices generally involve user device(s) that communicate with the network devices via network-based connection and/or a serial-based connection to discover a physical topology (e.g., interrack locations and a wiring arrangement) surrounding the hardware devices. These user device(s) may cross-reference the discovered physical topology against the template file in order to validate the hardware devices. Once the topology physical/logical configuration is fully generated, the deployment of a new fabric instance, or the expansion of an existing fabric instance can commence.

Next, the user device(s) may initiate communication with a cloud-computing fabric of a data center in order to effectuate the phases that deploy the hardware inventory within the fabric of the data center as a fabric-computing cluster (FCC) and provision security on the FCC. These phases involve various workflows that support setting up the hardware cluster to interact with resources and existing hardware within the data center. In addition, these workflows may include the following steps: preparing an infrastructure state from information gathered upon verifying the physical topology of the hardware inventory; integrating the hardware inventory within the fabric of the data center by sharing the infrastructure state with a fabric controller; deploying services running on the fabric within the hardware inventory; and designating the hardware inventory as a data-center FCC. Accordingly, when carried out in succession, these phases of the bootstrap process promote end-to-end automation for building out a hardware inventory and for integrating the hardware inventory within a fabric of a data center. This end-to-end automation may further achieve an efficient, robust, and scalable framework either within the hardware inventory preestablished within the data center (e.g., reconfiguring an existing FCC to represent a new FCC instance within the data center), or at a site external to the data center (e.g., integrating a remote hardware inventory as a new FCC instance within the data center).

BRIEF DESCRIPTION OF THE DRAWINGS

Embodiments of the present invention are described in detail below with reference to the attached drawing figures, wherein.

DETAILED DESCRIPTION

The subject matter of embodiments of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies.

Generally, embodiments of this invention introduce technology within a cloud-computing fabric to automatically merge an unrefined set or inventory of hardware with a data center by employing a bootstrap process. As used herein, the phase "hardware inventory" is not meant to be limited to any particular configuration of components, but broadly refers to any compilation of devices (e.g., network devices, computing devices, and power-supply devices) that may be eventually integrated within the fabric. In one instance, the hardware inventory may be located within a private enterprise network managed by a customer of a cloud-computing-network service provider, where implementing the bootstrap process as an appliance on this type of hardware inventory allows for remote reachability between the data center and the private enterprise network. In another instance, the hardware inventory may be located within the data center managed by the cloud-computing-network service provider, where implementing the bootstrap process allows for building out local storage/computing capacity of the data center.

As will be discussed more fully below, the bootstrap process features end-to-end automation using one or more workflow engines (running on a user device 310 of FIG. 5) that drive the orchestration and execution of various phases comprising the bootstrap process. In embodiments, these phases can be carried out as independent workflows such that each phase may be invoked and driven to completion separately without reliance on concurrent operation of another phase or workflow. By allowing the phases to be carried out independently in a self-contained manner, each phase consistently delivers incremental improvements to hardware inventory without any adverse interactions of previous or subsequent workflows.

Having briefly described an overview of embodiments of the present invention, an exemplary operating environment suitable for implementing embodiments of the present invention is described below.

Operating Environment

Figure 1:
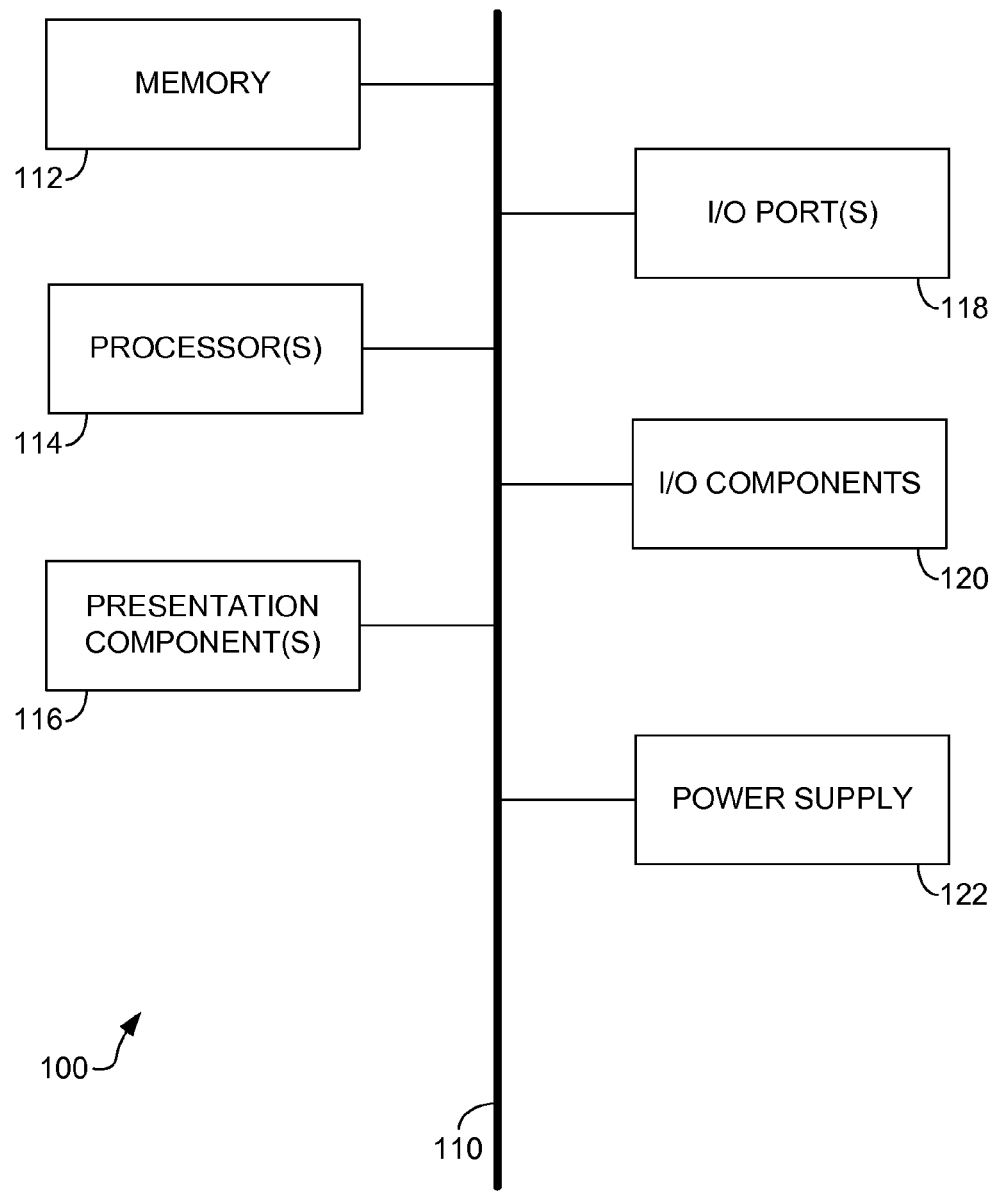
FIG. 1 is a block diagram of an exemplary computing environment suitable for use in implementing embodiments of the present invention.

Referring initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that performs particular tasks or implements particular abstract data types. The invention may be practiced in a variety of system configurations, including handheld devices, consumer electronics, general-purpose computers, more specialty computing devices, etc. The invention may also be practiced in distributed computing environments where tasks are performed by remote-processing devices that are linked through a communications network.

With reference to FIG. 1, computing device 100 includes a bus 110 that directly or indirectly couples the following devices: memory 112, one or more processors 114, one or more presentation components 116, input/output (I/O) ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "handheld device," etc., as all are contemplated within the scope of FIG. 1 and reference to "computing device."

Computing device 100 typically includes a variety of computer-readable media. Computer-readable media can be any available media that can be accessed by computing device 100 and includes both volatile and nonvolatile media, removable and nonremovable media. By way of example, and not limitation, computer-readable media may comprise computer storage media and communication media. Computer storage media include both volatile and nonvolatile, removable and nonremovable media implemented in any method or technology for storage of information such as computer-readable instructions, data structures, program modules, or other data. Computer storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium, which can be used to store the desired information and which can be accessed by computing device 100. Communication media typically embody computer-readable instructions, data structures, program modules or other data in a modulated data signal such as a carrier wave or other transport mechanism and include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media. Combinations of any of the above should also be included within the scope of computer-readable media.

Memory 112 includes computer-storage media in the form of volatile and/or nonvolatile memory. The memory may be removable, nonremovable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, etc.

Phases of the Bootstrap Process

Figure 2:
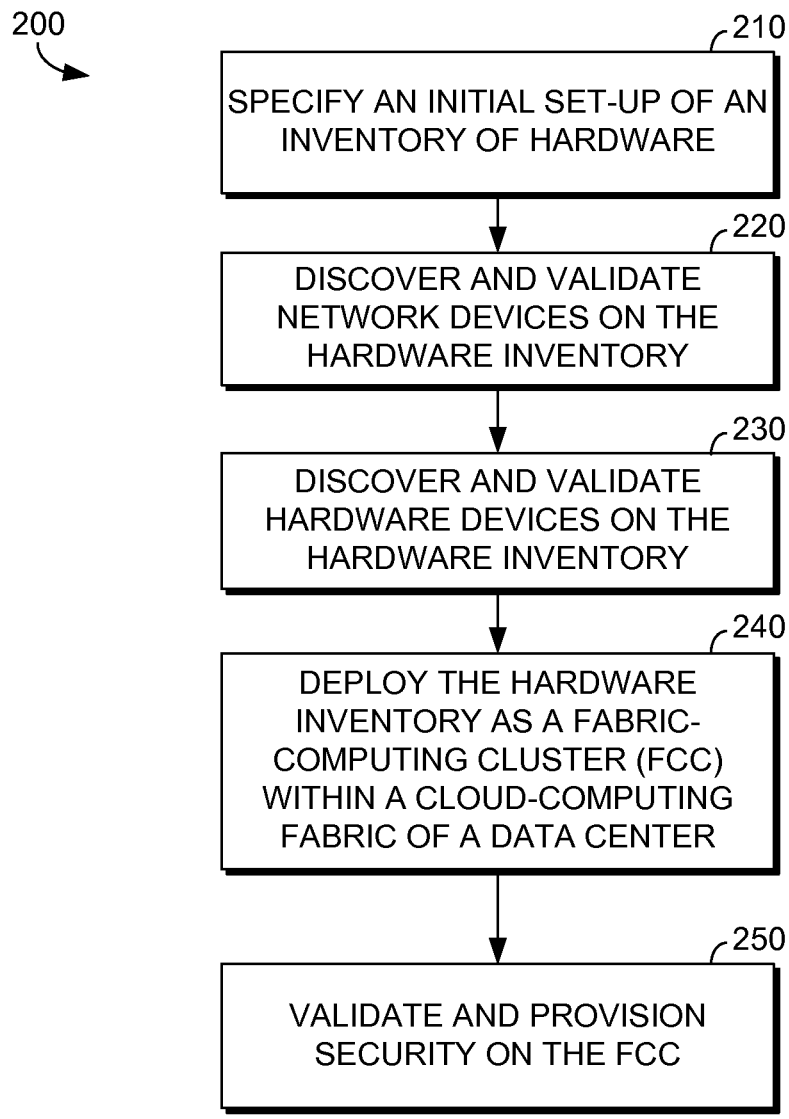
FIG. 2 is a flow diagram showing exemplary phases of a bootstrap process for incorporating an inventory of hardware into a cloud-computing fabric of a data center, in accordance with an embodiment of the present invention.

The individual phases of the bootstrap process for establishing interoperation between an inventory of hardware and a cloud-computing fabric of a data center will now be discussed with reference to FIG. 2. Generally, FIG. 2 illustrates a flow diagram 200 that shows five exemplary phases of a bootstrap process for incorporating the hardware inventory into the fabric of a data center, in accordance with an embodiment of the present invention. In embodiments, building out the hardware inventory as a fabric-computing cluster (FCC) using the phases discussed below may be carried out by a configuration software (see reference numeral 311 of FIG. 3) on a user device (see reference numeral 310 of FIG. 3). The user device along with the hardware inventory, data center, and/or other network device act in concert to form various ecosystems that each implement one or more phases of the bootstrap process.

Returning to FIG. 2, as depicted at block 210, the first phase of the bootstrap process includes a workflow for specifying an initial set-up of the hardware inventory. Generally, the workflow results in generating the logical/physical configuration needed to deploy the fabric network between blocks 230 and 240. During the first phase, the workflow may involve gaining an understanding about an initial configuration of the hardware inventory before releasing the hardware inventory as an FCC of the data center. For instance, the first-phase workflow may attempt to validate the initial configuration of the hardware inventory to ensure it corresponds with an expected hardware layout (e.g., device locations, IP addresses, VLANs, and wiring) and to ensure it meets certain regulations enforced by the data center (e.g., flagged unsecure components are absent and desirable communication components are present).

In an exemplary embodiment, the workflow of the first phase is concerned with verifying that the initial logical resources and the appropriate specification of those resources matches a supported configuration. One instance of verifying may involve determining whether there sufficient network resources (e.g., IP addresses, VLANs, ports, and the like) provided in the configuration to match the desired configuration articulated by the specification. For example, the first-phase workflow may verify that at least 1 IP address is provided per machine if such a condition exists within the specification.

Another instance of verifying may involve determining whether there exists an overlap of the configuration with known existing ranges (e.g. accidentally provided resources that are presently in use). Yet another instance of verifying may involve determining whether the planned set of resources constitute a supported configuration (e.g., are there enough of each required resource to meet the specification, is the combination of these type of resources supported, is the detected TOR switch compatible with the detected blades). In still another instance of verifying involves determining whether interaction with the end-user/customer is needed to gather resources required for the execution (e.g., passwords, addresses, IP blocks, VLANs, and the like).

As depicted at block 220, a second phase for discovering, validating network devices, and wiring checks may be implemented on the hardware inventory. In embodiments, the workflow of the second phase may involve communicating with a top-of-rack (TOR) switch and a serial-access device of the network devices via a serial-based connection and a network-based connection, respectively. Further, the second-phase workflow may involve sending instructions over one or more of the connections that prompt the TOR switch and/or the serial-access device to selectively induce hardware devices (e.g., processors, processing units, computing devices, servers, and blades inserted into a rack) to send traffic to the user device for analysis and may involve the use of a power distribution unit (PDU) to selectively power-cycle the devices to reset their state. This analysis may include discovering and validating the hardware devices, as depicted at block 230. That is, the third phase of the bootstrap process employs data packets that are carried from the hardware devices to the user device. A workflow of the third phase may involve parsing the content (e.g., payload and header) of the data packets to determine the location or absence of, configuration of, and internal connections to the hardware devices.

In embodiments, the third-phase workflow may also send specific workflows, tools, etc. to the various devices and/or blades to perform validation, update and/or configuration of hardware and/or software components (e.g., BIOS and device firmware) within the devices/blades themselves. In other embodiments, the workflow of the third phase may execute "smoke tests," which serve to verify components with the devices/blades are functional and meet the fabric requirements. Further, the third-phase workflow may identify the model, manufacturer, and firmware version of devices/blades for recordation and eventual use.

As depicted at block 240, the fourth phase of the bootstrap process involves deploying the inventory as an FCC instance within the fabric of the data center. In an exemplary embodiment, the fourth-phase workflow may involve sharing with the fabric an infrastructure state of the hardware inventory (e.g., generated during at least one of the previous phases) and installing services on the hardware inventory that allow for interaction with the fabric. Installing services onto the hardware inventory may correspond with one of multiple scenarios, which are discussed in the paragraph below. As depicted at block 250, the fifth phase of the bootstrap process involves cluster-wide validation and provisioning of the security measures on the hardware inventory once it is designated as an FCC instance. In an exemplary embodiment, the fifth-phase workflow may involve passing data (e.g., device credentials, original certificates, private keys, and passwords) between a secret store associated with the new FCC instance and a controller of the fabric.

Although five distinct phases of the bootstrap process have been described, it should be understood and appreciated that other types of suitable arrangements of workflows that help advance the incorporation of the hardware inventory within a fabric of a data center may be used, and that embodiments of the present invention are not limited to the five phases described herein. For instance, embodiments of the present invention contemplate dividing a workflow of an individual phase (e.g., phase five) into separate workflows (e.g., cluster-wide validation and security provisioning) that can be performed in a mutually-exclusive fashion.

Examples of the multiple scenarios for installing services onto the hardware inventory will now be described. In one scenario, the hardware inventory represents equipment that is new to the data center and that is not previously configured. Accordingly, the new hardware is configured to operate transparently with existing resources of the data center and is cleanly integrated within the data center as a new FCC instance or cloud-computing stamp that is managed by a controller of the cloud-computing fabric.

In another scenario, the hardware inventory represents a local extension of the data center that is added upon the data center requesting additional storage/computing capacity. The local extension may include a rack of blades that build out to allow for management by a fabric controller. In embodiments, the process of building out involves discovering a wiring pattern of the blades within the rack, validating the wiring pattern against a predefined template file, and approving the blades for incorporation into the data center. In effect, building out the blades helps to ensure that any latent wiring issues or hardware issues (e.g., physical defects missing parts, invalid versions of parts, or improper configuration) within the rack are detected and addressed, thereby ensuring that incorporation of the blades within the data center will not adversely impact the live underlying support being offered by the data center to services running thereon.

In yet another scenario, the hardware inventory is configured with its own instance of a cloud-computing fabric that is separate and partitioned from the fabric currently intercoupling resources of the data center. Thus, upon incorporation of the hardware inventory into the data center, the data center will run at least two cloud-computing fabrics (e.g., operating systems) that function to isolate services assigned to the newly bootstrapped hardware inventory from services assigned to the original data center. In this way, separate fabrics may be dedicated to services of particular customers, thereby virtually and physically excluding/protecting some services from others within the data center (e.g., build-out/bootstrap in a data-center container).

In still another scenario, referred to as a return manufacture authorization (RMA) scenario, the hardware inventory represents computing device(s) or other devices (e.g., network, PDU, and serial) that are deemed unreachable (e.g., inoperable or disconnected) by the controller of the fabric of the data center (hereinafter "fabric controller"). During lifecycle management of hardware, the fabric controller may periodically solicit a status of computing devices (e.g., physical machines and/or virtual machines) aggregated within the data center. Soliciting the status may involve communicating requests to agents running on the computing devices, respectively, and receiving health information in return. If the fabric controller is unable to reach a particular computing device for any reason (e.g., a network device that interconnects the computing device to the fabric controller fails), the fabric controller can raise an alert that indicates the hardware inventory is unreachable.

Upon recognizing the hardware inventory as unreachable, the fabric controller may initiate an auto-healing procedure. In embodiments, the auto-healing procedure includes at least the steps of evacuation and validation, where validation is often carried out within one or more phases of the bootstrap process as well. The step of evacuation may involve transferring services (e.g., customer-owned applications and system-based applications) consuming resources on the unreachable hardware inventory to a replacement hardware inventory. As such, evacuation ensures that the auto-healing procedure is transparent to the customers of the data center because the visibility to their services is not impacted during validation, and maintenance.

Once the evacuation is successfully performed, the step of validation is invoked. In an exemplary embodiment, the step of validation includes carrying out a workflow of the bootstrap process that verifies configuration settings of components residing within the unreachable hardware inventory and cross-references a detected physical topology (e.g., links between components and wiring between devices) of the unreachable hardware inventory against an expected physical topology (e.g., provided within the template file) of the unreachable hardware inventory. As such, the step of validation determines whether the unreachable hardware inventory is properly configured to interact with drivers of the fabric controller, where the drivers are designed to interact with specific hardware configurations.

As more fully discussed below, the step of validation involves taking the unreachable hardware inventory offline, which is the reason for conducting the step of evacuation beforehand. Generally, the unreachable hardware inventory is taken offline because several destructive actions occur that would interrupt the execution of services on devices of the unreachable hardware inventory and/or on devices of the data center. These destructive actions may include one or more of the following: manipulating a flow of power (e.g., turning on and off) to a blade by requesting a serial-access device to selectively drive a power (via a PDU) thereto; gathering information from traffic sent from the manipulated blade; extracting information (e.g., MAC address of the blade) from content of data packets sent within the traffic; and verifying the location and wiring of the blade by evaluating the extracted information against the template file and performing validations. It should be noted that the serial-access device is typically used for out-of-band communication, while the TOR switch employs in-band communication (e.g., via the Ethernet).

In an example of selectively driving power to the blade, the fabric controller may turn off power to a range of ports that feed the blades of the unknown/invalid hardware inventory. Next, the fabric controller may directly or indirectly instruct the PDU to turn on power to a selected port that links to a subject blade. The fabric controller may then read the MAC address from data packets being sent from the subject blade that is currently sending traffic. Thus, connectivity of the subject blade is verified when the selected port corresponds with an expected port of the template file. Beyond verifying the selected port for receiving power from the PDU, the step of validation may further involve a TOR switch that can determine which port—within a range of ports allocated to the blades of the unknown hardware inventory—is connected to the subject blade. This determination is made by identifying a subject port of the port range that is receiving the data packets being delivered from the subject blade.

Workflow for the Coauthoring Phase

The workflow of the coauthoring phase (see block 210 of FIG. 2) facilitates specifying an original set-up of the hardware inventory and generates, as a result, a template file that is consulted during validation. Initially, an original equipment manufacturer (OEM) is expected (e.g., as part of a contract for goods) to verify interdevice wiring prior to shipping a hardware inventory. This could be done by individually invoking first three phases, depicted at blocks 210, 220, 230 of FIG. 2, of the workflow separately. Further, the OEM is expected to employ tools that provide a manifest describing attributes of software installed within the devices of the hardware inventory. The wiring verification and software-attribute manifest are maintained in association with the hardware inventory for assisting in the selection of an appropriate hardware inventory. In some embodiments, the OEM may set the hardware inventory to a zero configuration.

In operation of the coauthoring-phase workflow, an order for a hardware inventory may be initiated automatically or manually by an administrator to remedy a storage/computing capacity deficiency. In one instance, initiating the order involves generating a form (e.g., XML document) with nonspecific data surrounding a set of equipment (e.g., devices, racks, and software) targeted to fulfill the capacity deficiency. Preliminary values may be entered onto the form automatically or manually by the administrator, where the preliminary values reflect data-center specific details (e.g., VLAN range, port range, and IP addresses) or a customer-defined topology schema. The topology schema defines a type, quantity, and wiring pattern of the hardware and network devices of the hardware inventory and indicates additional information used for running the devices (e.g., number of racks, VLAN range, number of ports, and supporting resources).

Upon entry of the values, the form may be converted into a symbolic representation. The symbolic representation serves as a high-level, logical blueprint of equipment (e.g., devices) and the routing (e.g., wiring) therebetween. For example, the symbolic representation may indicate which pieces of equipment are grouped within a common VLAN.

The symbolic representation may be sent to the OEM, customer, or Administrator—based on the scenario—to select an appropriate hardware inventory. In one instance, selection of the appropriate hardware inventory includes comparing the symbolic representation against the wiring verification and/or the software-attribute manifest that are maintained in association with hardware inventories at the OEM. Upon selecting the appropriate hardware inventory, the selected hardware inventory may be checked using lightweight software provided to OEM by the customer or administrator. In embodiments, the lightweight software can also be run at the delivery dock upon the arrival of the hardware inventory to data center, which occurs before OEM hand-off. This early checking can detect any issues that may have been introduced to the hardware inventory during transport.

Generally, the lightweight software carries out a set of tasks that can be run on the hardware-inventory devices without knowing the IP or MAC addresses of those devices. In operation, the lightweight software verifies physical wiring onsite at the OEM prior to shipping, where the verification consults the symbolic representation to ensure the selection is proper. Occasionally, the lightweight-software verification may be used as an alternative implementation of the phases depicted at blocks 220 and 230 of FIG. 2, with network checks changed such that globally accessible IP addresses are not required.

After shipping from the OEM, the administrator may visually validate that devices and wiring of the devices satisfies the symbolic representation upon taking delivery of the hardware inventory. Further, the administrator may visually inspect the wiring (e.g., serial and network cable connectivity) of the hardware inventory, determine actual values (e.g., port numbers, IP addresses, VLAN membership, and device locations) of the hardware inventory based on the inspection, and replace/convert the preliminary values entered within the symbolic representation with the actual values. Besides manual inspection by the administrator, the inspection may be automated if device drivers for network devices are available, where automation can be used to configure the network devices per the symbolic representation specification. This symbolic representation with the preliminary values replaced by or converted to actual values mined from the delivered hardware inventory is referred to herein as the "template file." As more fully discussed below, the template file is used in subsequent phases of the bootstrap process to indicate how the user device is connected to hardware inventory and to provide assurance that the hardware inventory is properly configured.

Architecture of a Verification Ecosystem

The architecture of the verification ecosystem that discovers, validates, and configures network and hardware devices of an inventory of hardware will now be discussed with reference to FIGS. 3 and 4. Generally, FIG. 3 depicts a graphical representation illustrating a verification ecosystem 300 for discovering, validating, and configuring a first type of topology of the hardware inventory 360, while FIG. 4 depicts a graphical representation illustrating a verification ecosystem 400 for discovering, validating, and configuring a second type of topology of the hardware inventory 360.

Figure 3:
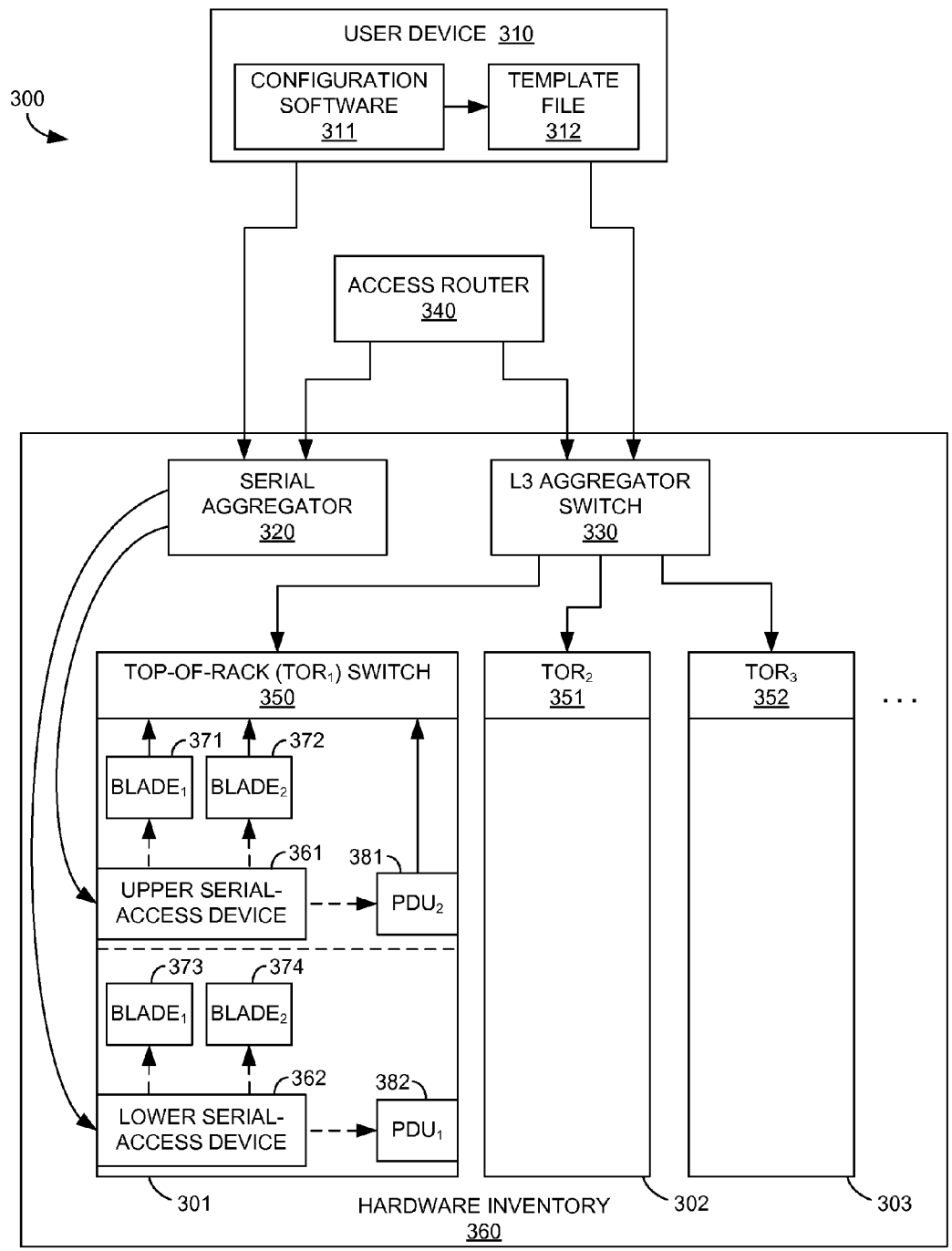
FIG. 3 is a graphical representation illustrating an exemplary verification ecosystem for discovering, validating, and configuring a first type of topology of an inventory of hardware, the verification ecosystem being suitable for use in implementing embodiments of the present invention.
Figure 4:
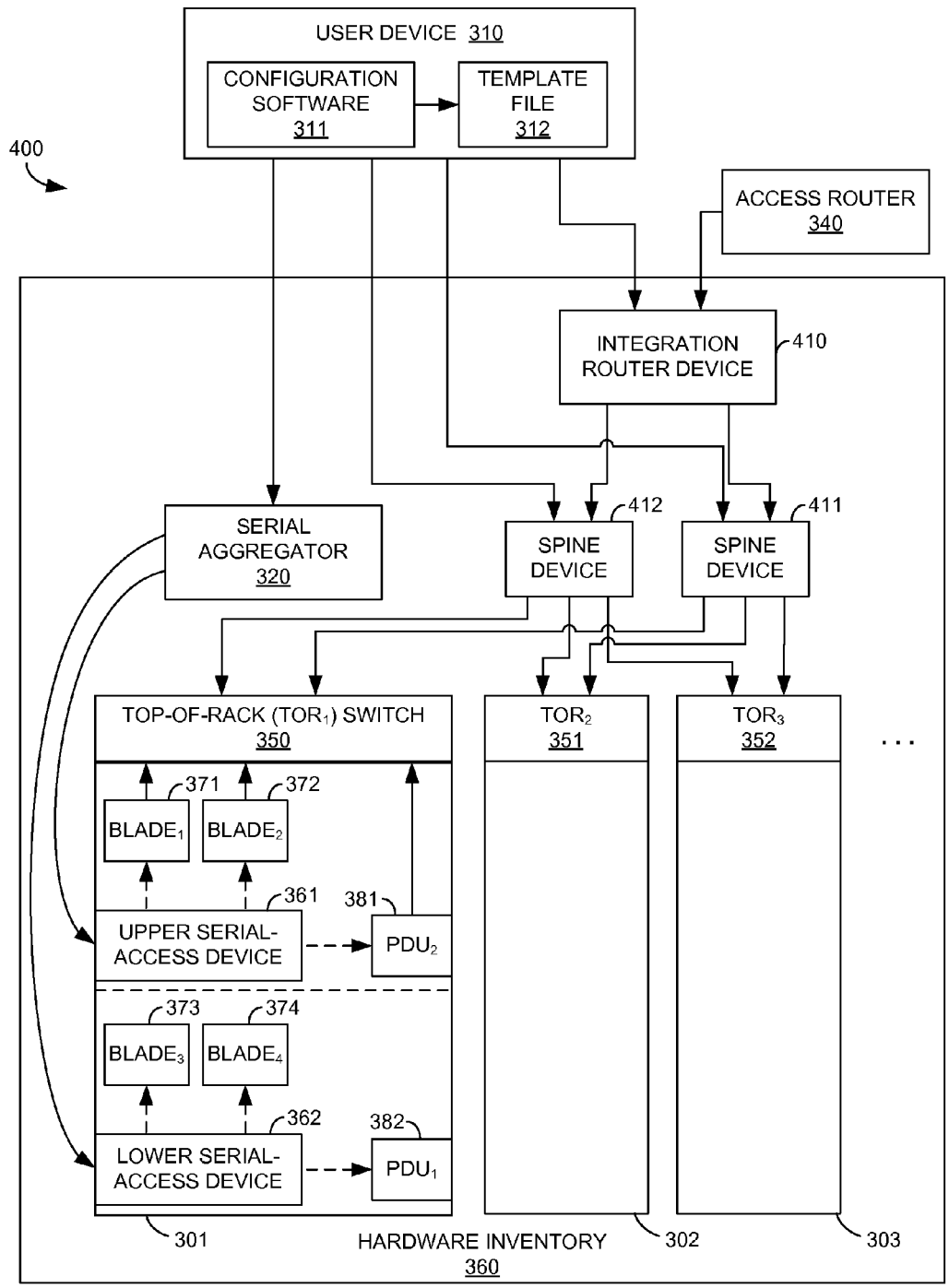
FIG. 4 is a graphical representation illustrating the exemplary verification ecosystem for discovering, validating, and configuring a second type of topology of the hardware inventory, the verification ecosystem being suitable for use in implementing embodiments of the present invention.

Initially, with reference to FIG. 3, the verification ecosystem 300 includes a user device 310 that is communicatively coupled with components of the hardware inventory 360. In an exemplary embodiment, the communicative coupling is organized into at least a network-based connection and a serial-based connection. As illustrated in FIG. 3, the serial-based connection involves a communication path between the user device 310 and the serial-access devices 361 and 362 via a serial aggregator 320, where the serial aggregator 320 is responsible for properly distributing instructions from the user device 310 to an appropriate serial-access device (e.g., by processing addresses carried within data packets streaming from the user device 310). The network-based connection involves a communication path between the user device 310 and the top-of-rack (TOR) switches 350, 351, and 352 via an L3 aggregator switch 330, where the L3 aggregator switch 330 is responsible for properly delivering data packets from the TOR switches 350, 351, and 352 to the user device 310 (e.g., aggregates data packets from multiple network devices), as opposed to the access router 340. It should be noted that communication with the TOR switches 350, 351, and 352 could be done via the serial aggregator 320 as well. In operation, the access router 340 acts as an uplink between an existing infrastructure and the hardware inventory 360. Accordingly, when rendered interoperable as indicated in FIG. 3, the access router 340 serves to isolate hardware inventory 360 from the rest of the existing infrastructure, as well as the Internet. As more fully discussed below, by ensuring that there is no broadcast traffic entering or leaving through the uplink, the access router 340 helps negate any impact upon external services currently running on the existing infrastructure.

In this way, the verification ecosystem 300 operates in a self-contained manner that confines messaging to intercommunication between the user device 310 and the hardware inventory 360 in order to ensure proper isolation between the hardware inventory 360 being built out and an existing infrastructure (e.g., data center 550). This isolation is useful in at least the following two respects: providing a higher reliability during the bootstrap process by limiting external interference, and ensuring any currently live hardware within the existing infrastructure is not impacted by the bootstrap process. In embodiments, the isolation is configured as a security boundary that serves as a virtual layer separating the existing infrastructure and the hardware inventory 360, which cannot be considered as trusted until each of the phases succeed. Accordingly, the bootstrap process itself does not depend on a security context of the existing infrastructure—generally, during the final phases of the bootstrap process (prior to the validation and provisioning phase) the security credentials/tokens are set up.

The configuration of the verification ecosystem 300 will now be discussed. Initially the ecosystem 300 includes the user device 310 for linking to and controlling functionality of racks 301, 302, and 303 within the hardware inventory 360. With respect to the rack 301 (e.g., high-density rack), there exists one or more power-distribution units (PDUs) 381 and 382, computing units (e.g., blades 371-374), and network devices (e.g., TOR switch 350, upper serial-access device 361, and lower serial-access device 362). It should be noted that there may be additional TOR switches per rack (e.g., upper and lower TOR devices). The computing devices 371-374 are designed as processors to carry out computing/storage tasks and are configured by OEM to individually generate data packets upon respectively receiving power, while the PDUs are designed to selectively supply power to the computing devices 371-374. The TOR switch 350 is configured for sending data packets over the network-based connection, while the serial-access devices 361 and 362 are configured for invoking generation of the data packets upon receiving instructions over the serial-based connection. In embodiments, the serial-access device 362 may be used to configure devices within the rack (e.g., PDUs, TOR switches, and blades).

The user device 310 includes configuration software 311 that is designed to drive at least the initial phases of the bootstrap process. The configuration software 311 is communicatively coupled to the TOR switch 350 via the network-based connection (in-band channel) and to the serial-access devices 361 and 362 via the serial-based connection (out-of-band channel). In embodiments, the initial phases of the bootstrap process comprise: discovering the network devices (TOR switch 350 and serial-access devices 361 and 362) and the set of blades (computing units 371-374); and validating a location of the set of blades by comparing information carried within the data packets against a template file 312 that describes a physical topology of the rack 301. As discussed above, the template file 312 is generated upon completing the phase of specifying the initial set-up of the hardware inventory 360. The serial-access devices 361 and 362 are further configured to receive the instructions from the configuration software and, upon processing the instructions, control the PDUs 381 and 382, respectively. In one instance, controlling the PDUs 381 and 382 involves conveying instructions thereto. Upon receiving and reading the instructions, the PDUs 381 and 382 may be configured to deliver power to at least one selected blade of the computing devices 371-374 and to withhold power from at least one nonselected blade of the computing devices 371-374. In response, the selected blade(s) may commence generation of data packets that are aggregated at the TOR switch 350 and subsequently at the L3 aggregator switch 330 before being routed to the configuration software. On the other hand, the nonselected blade(s) will likely abstain from sending data packets. Thus, the configuration software is able to confirm the internal connections between the network devices 350, 361, and 362, the computing devices 371-374, and the PDUs 381 and 382 as a function of a comparison between a location the blades selected by the instructions and the origination addresses of data packets being generated within the rack 301. Additionally the computing devices 371-374 may be configured to emit data over the serial output to the serial-access devices 361 and 362, which are then able to validate the internal connection from blades to serial pathways, and to PDUs 381 and 382.

Although various different configurations of network devices 350, 361, and 362 have been described, it should be understood and appreciated that other types of suitable devices and/or machines that distribute or aggregate messages may be used, and that embodiments of the present invention are not limited to the serial-access devices 361 and 362 and TOR switch 350 described herein. For instance, a single serial-access device may be provided for the entire rack 301, where the serial-access device acts as a serial connection/interface to the PDUs 381 and 382, and acts as a serial connection/interface to each of the blades. In another instance, a serial access device and a PDU may be combined into a single device. In yet another instance, the TOR switch 350 may be replaced with a specialized blade that has Ethernet interface capability. Accordingly, the discovery and validation phase may be carried out using any number of network devices such that at least one network device includes in-band capabilities for network communication and at least one network device includes out-of-band capabilities for serial communication. Or, if the out-of-band capabilities are employed over the Ethernet, then a secondary network switch may be used in place of the serial device. In this way, the in-band capabilities compliment the out-of-band capabilities and allow for debugging and diagnosis of the network devices, as well as continued access to the computing devices 371-374, if one of the capabilities falls offline.

It will be understood and appreciated by those of ordinary skill in the art that the ecosystem 300 shown in FIG. 3 is merely an example of one suitable portion of an environment for carrying out phases of the bootstrap process and is not intended to suggest any limitation as to the scope of use or functionality of embodiments of the present invention. Neither should the ecosystem 300 be interpreted as having any dependency or requirement related to any single resource or combination of resources illustrated therein. Further, although the various blocks of FIG. 3 are shown with lines for the sake of clarity, in reality, delineating various components is not so clear, and metaphorically, the lines would more accurately be grey and fuzzy.

The hardware inventory 360 includes various equipment/resources interconnected to the user device 310 via serial-based connections and/or network-based connections. This equipment/resources, as described herein, may include software components (e.g., installed in the network devices) as well as tangible hardware elements, such as racks 301, 302, and 303 and the user device 310. The equipment/resources may be distributably placed across various physical resources, thus, the user device 310 may recognize a location of the equipment/resources through the discovery and validation phases (see reference numerals 220 and 230 of FIG. 2) in order to establish communication therebetween. In addition, a network (not illustrated) may be provided that facilitates this communication over channels connecting the equipment/resources, and any other elements required by the bootstrap process. The network may include, without limitation, one or more local area networks (LANs) and/or wide area networks (WANs). Such networking environments are commonplace in offices, enterprise-wide computer networks, intranets, and the Internet. Accordingly, the network is not further described herein.

The exemplary system architecture of the ecosystem 300 includes the user device 310 and the computing devices 371-374. Each of these devices 310 and 371-374, shown in FIGS. 3 and 4, may take the form of various types of computing devices, such as, for example, computing device 100 described above with reference to FIG. 1. By way of example only and not limitation, the devices 310 and 371-374 may be a personal computer, desktop computer, laptop computer, consumer electronic device, handheld device (e.g., personal digital assistant), various servers, blades, and the like. It should be noted, however, that the invention is not limited to implementation on such computing devices, but may be implemented on any of a variety of different types of computing devices within the scope of embodiments of the present invention.

Typically, each of the devices 310 and 371-374 include, or is linked to, some form of a computing unit (e.g., central processing unit, microprocessor, etc.) to support operations of the component(s) running thereon (e.g., originating data packets upon receiving a signal or being supplied power). As utilized herein, the phrase "computing unit" generally refers to a dedicated computing device with processing power and storage memory, which supports operating software that underlies the execution of software, applications, and computer programs thereon. In one instance, the computing unit is configured with tangible hardware elements, or machines, that are integral, or operably coupled, to the devices 310 and 371-374 to enable each device to perform communication-related processes and other operations. In another instance, the computing unit may encompass a processor (not shown) coupled to the computer-readable medium accommodated by each of the devices 310 and 371-374. Generally, the computer-readable medium stores, at least temporarily, a plurality of computer software components that are executable by the processor. As utilized herein, the term "processor" is not meant to be limiting and may encompass any elements of the computing unit that act in a computational capacity. In such capacity, the processor may be configured as a tangible article that processes instructions. In an exemplary embodiment, processing may involve fetching, decoding/interpreting, executing, and writing back instructions (e.g., reconstructing the physical gestures by presenting animations of the motion patterns).

Also, beyond processing instructions, the processor may transfer information to and from other resources that are integral to, or disposed on, the devices 310 and 371-374. Generally, resources refer to software and hardware mechanisms that enable the devices 310 and 371-374 to perform a particular function. By way of example only, the resources may include one or more of the following mechanisms: configuration software 311; a template file 312; and components residing within the computing devices 371-374.

An exemplary workflow for discovering and validating the network devices 350, 361, and 362, and the computing devices 371-374 (e.g., blades$_{1-4}$) within the ecosystem 300 will now be discussed with reference to FIG. 3. Initially, the configuration software 311 attempts to gain access to the hardware inventory 360 via the serial aggregator 320 of the serial-based connection. Once access is gained, an identification of the serial aggregator's 320 ports that are linked to serial-access devices (e.g., serial-access devices 361 and 362) of the hardware inventory 360 is made. Signals are then sent through serial-based connections from the identified ports to discover the serial-access devices 361 and 362. The information extracted from the discovered serial-access devices 361 and 362 is cross-referenced against the template file 312. As more fully discussed above, the template file 312 includes the following: a topology schema that represents a blueprint of the expected devices (e.g., devices 350, 361, 362, and 371-374) and the expected wiring there between; and a hardware schema that defines the components that are expected to reside within each of the computing devices 371-374.

Upon discovering the serial-access devices 361 and 362 as being properly connected via the serial aggregator 320, the configuration software 311 may distribute instructions over the serial-based connection to the serial-access devices 361 and 362. The distributed instructions, once processed by the serial-access devices 361 and 362, allow the configuration software 311 to access the TOR switch 350 and the PDUs 381 and 382 via internal coupling of the rack 301. Upon reaching the PDUs 381 and 382, the configuration software 311 may provide instructions that selectively control power to the computing devices 371-374. It should be noted, in embodiments, that prior to controlling the serial-access devices 361 and 362 and PDUs 381 and 382, the configuration software 311 may validate the devices, may validate the software on these devices (e.g., ensuring the firmware and OS are supported versions), and may configure these devices to the specification(s) required by the fabric.

For instance, selectively controlling power may involve turning off power to each of the computing devices 371-374, targeting one or more of the computing devices 371-374 listed in the template file 312, and turning on power to the targeted computing device(s). Once power is supplied to the targeted computing device(s), data packets may be generated and sent from the targeted computing device(s). The data packets are then aggregated at the TOR switch 350, which may scan a range of ports allocated for receiving data packets from the computing devices 371-374 and indentify the port(s) from the port range that is actually receiving the data packets. Also, the TOR switch 350 may identify an address (e.g., MAC address or IP address) that is previously assigned thereto. Upon gathering this information, the TOR switch 350 may append the identified port(s) and/or the identified address to the data packets before routing them back to the configuration software 311 via the L3 aggregator switch 330 over the network-based connection.

The configuration software 311 is designed to capture the data packets from a flow of traffic being sent from the hardware inventory 360. Further, the configuration software 311 is designed to validate the computing devices 371-374. Validation may involve one or more of the following steps: extracting information (e.g., address of the targeted computing device(s) and TOR switch 350, and ports on the TOR switch 350 and the serial-access devices 361 and 362 identified as being internally coupled to the targeted computing device(s)) carried within the data packets; and comparing the extracted information against the template file 312 to confirm the addresses and internal coupling matches the topology scheme.

Further, the data packets may deliver information that provides the configuration software 311 with an insight to the components, as well as the configuration settings applied to the components, presently residing on the targeted computing device(s). These delivered configuration settings may be compared against expected configuration settings maintained within the hardware schema of the template file 312. The reconfiguration of the targeted computing device(s) may be prompted when the delivered configuration settings do not correspond with the expected configuration settings. This reconfiguration may be performed via the serial-access device 361 or via the network connection through the TOR switch 350.

It should be appreciated and understood that the steps above for discovering and validating the network and hardware devices may be executed iteratively such that the computing devices 371-374 and the network devices 361, 362, and 350 may be targeted recursively to validate location of and connections to each of the devices 371-374, 361, 362, and 350 in succession. Thus, the entire wiring pattern of the rack 301 may be distilled from simply repeating the steps above.

Turning now to FIG. 4, a variation of the system architecture underlying the ecosystem 300 will now be discussed. Generally, FIG. 4 shows a graphical representation illustrating an exemplary verification ecosystem 400 for discovering, validating, and configuring a second type of topology of the hardware inventory 360, the verification ecosystem being suitable for use in implementing embodiments of the present invention. As shown, the serial aggregator 320 remains employed to route to communications over the serial-based connection, while the L3 aggregator switch 330 of FIG. 3 is replaced with one or more spine devices 411 and 412 and at least one integration router device 410. These devices 410-412 are generally organized in a tree-shaped topology, where there are progressively fewer connections when moving upward along the tree (e.g., the two spine devices 411 and 412 are parent nodes of three TOR switches 350-352 and are child nodes of one integration router device 410). In operation, this tree-shaped topology serves to aggregate communications from multiple devices—including the computing devices 371-374 of the racks 301-303.

The devices 410-412, router 340, and the TOR switches 350-351 of the ecosystem 400 of FIG. 4 will now be described more fully. The spine devices 411 and 412 are configured to fan out the user-device 310 messages and other internal traffic within the hardware inventory 360 to promote a faster speed of communication between devices. Generally, traffic between the spine devices 411 and 412 and other devices is locally generated and locally distributed during the initial phases of the bootstrap process (i.e., rarely handling outbound traffic). Further, the spine devices 411 and 412 may be each connected to multiple common racks 301-303 in order to expand and optimize the local traffic between the racks 301-303 and throughout the hardware inventory 360. The integration router device 410 is configured to aggregate the local traffic, thereby allowing for greater bandwidth during the bootstrap process.

In embodiments, the TOR switches 350-352 are configured to aggregate traffic from and distribute traffic to devices within the racks 301-303, respectively. In one instance, the TOR switches 350-352 represent L3-type network devices that are capable of routing traffic within a virtual local area network (VLAN) established within the hardware inventory 360 during the initial set-up phase of the bootstrap process. However, embodiments of the present invention consider conveying traffic over different layers of communication supported by the TOR switches 350-352.

In embodiments, the access router 340 serves as a gateway between the hardware inventory 360 and any external devices besides the user device 310. In this way, by restricting inbound and outbound communications at the access router 340, the hardware inventory 360 functions as a self-contained unit of deployment. For example, when the hardware inventory 360 represents a unit of deployment within a private enterprise network, the hardware inventory 360 is not enabled to operate in concert (e.g., as an instance of a cloud-computing network) with the local servers of the private enterprise network during the bootstrap process. In another example, when the hardware inventory 360 represents a unit of deployment within a remote data center, the hardware inventory 360 is not enabled to operate in concert (e.g., as an cloud-computing stamp) with the other cloud-computing stamps during the bootstrap process.

Although various different configurations of hardware inventories have been described, it should be understood and appreciated that other types of suitable machines that allow for increasing storage/computing capacity and suitable devices that route traffic between the machines may be used, and that embodiments of the present invention are not limited to the layouts of the ecosystems 300 and 400 described herein. That is, various other types of physical topologies of devices may appear within the hardware inventory 360, which are considered by embodiments of the present invention. In accompaniment to varying topologies, the template file 312 may vary correspondingly, such that the procedure for cross-referencing and validation may adapt to modifications in wiring (network schema) and changes in devices (hardware schema). Consequently, as opposed to entirely rewriting the validation code each time a modification is made to the physical topology of a new hardware inventory 360 to be built out, a new template file 312 is simply generated based on the new hardware inventory 360 while the bootstrap-process phases for validating the network and hardware devices remain unchanged in procedure.

Thus, the ability to apply the bootstrap process to various physical topologies that presently exist—as well as to those that have not been yet developed—without overhauling the workflows of the respective phases allows for building out and deploying hardware inventories beyond a standard, uniform set-up of wiring and devices.

The phases of the bootstrapping process for discovering and validating the network and hardware devices within the hardware inventory 360 (see reference numerals 220 and 230 of FIG. 200) of the verification ecosystem 400 of FIG. 4 will now be described. Initially, the user device 310 is provided with configuration software 311 running thereon that is functional to set up an FCC from the hardware inventory 360. The user device 310 is hooked up to the serial aggregator 320 and the integration router device 410 to form the serial-based connection and the network-based connection, respectively, where the serial aggregator 320 and the integration router device 410 serve as the entry point for the user device 310 to build out the hardware inventory 360. The connectivity from the user device 310 may be performed directly or through additional network devices to route traffic between devices 310, 320, 330, 340 and 410 to enable communication therebetween.

In embodiments, the serial aggregator 320 and the integration router device 410 are set up by the OEM at a zero-configuration/zero-networking state. In this case, the configuration software 311 is enable to establish communication between the devices 310 and 360. Or, the serial aggregator 320 and the integration router device 410 are pre-configured to automatically route messages to the appropriate racks 301-303 and aggregate traffic returning from the racks 301-303. Thus, hooking up the user device 310 is generally the only manual set-up involved in the bootstrap process, and launching the configuration software 311 initiates the workflows that automatically discover devices and automatically commands the devices to respond.

As mentioned above, a template file 312 is provided at the user device 310, or maintained at a data store that is in communication with the user device 310. Generally, the template file 312 reveals the identity of the devices assembled to the racks 301-303 as well as the pattern of internal wiring between the devices. In one instance, the template file 312 includes a hardware schema that defines the expected locations and addresses (e.g., MAC addresses, IP addresses, or other unique identifiers assigned to network interfaces for directing communications on the physical network segments) for mapping the computing devices 371-374. For example, the hardware schema may specify that rack 301 include hardware devices identified as $BLADE_1$, $BLADE_2$, $BLADE_3$, and $BLADE_4$ (computing devices 371-374), while racks 301-303 are equipped with network devices identified as $TOR_1$, $TOR_2$, and $TOR_3$ (TOR switches 350-352), respectively. This is a comment: In FIG. 3, block 373 should be BLADE3, and block 373 should be BLADE4.

Further, the hardware schema may be programmed with a default set of credentials from a vendor of the hardware inventory 360 that permits initial access to the serial-access devices 361 and 362. By way of background, the credentials and/or addresses may be entered to the hardware schema upon a hardware-acceptance technician of the vendor scanning barcodes of devices shipped within the hardware inventory 360.

In another instance, the template file 312 includes a topology schema that defines internal wiring between the TOR switch 350, the computing devices 371-374, the PDUs 381 and 382, and the serial-access devices 361 and 362. Typically, the topology schema specifies wiring for various functional types (e.g., storage and compute) separately. In an exemplary embodiment, the topology schema includes ranges of ports within the serial aggregator 320 that are allocated to communicating with the serial-access devices 361 and 362 via the serial-based connection. Also, the topology schema may include ranges of ports within the devices 410-412 that are allocated to communicate with the TOR switches 350-352 via the network-based connection. Even further, in embodiments, the topology schema specifies expected slots within the allocated port ranges in which links to certain devices should occur in order for successful validation. For example, the topology schema may specify that slot 'A' of the range of ports at the spine device 412 is designated to link with $TOR_1$ (TOR switch 350), while slot 'B' of the range of ports at the $TOR_1$ is designated to link with $BLADE_2$ (computing device 372). In another example, the topology schema may specify that slot 'C' of the range of ports at the serial aggregator 320 is designated to link with the upper serial-access device 361, while slots 'D' and 'E' of the range of ports at the upper serial-access device 361 are designated to link with $BLADE_2$ and $PDU_2$ (PDU 381), respectively. Thus, the hardware and topology schemas, in conjunction, provide a way to identify physical locations of the hardware and network devices from perceived network communications.

At this point, the configuration software 311 may begin discovering and validating device locations and wiring by controlling the PDUs 381 and 382 to selectively supply power to the computing devices 371-374. Initially, the configuration software 311 sends a signal to one or more of the serial-access devices 361 and 362 in order to enable the serial-access devices 361 and 362 to drive the PDUs 381 and 382 in a controllable fashion. For the purpose of explanation, the discovery and validation of $BLADE_2$ (computing device 372), $TOR_1$ (TOR switch 350), and $PDU_2$ (PDU 381) will now be discussed to illustrate the workflows of the bootstrap process phases. In this exemplary case, the configuration software 311 may point a signal to the upper serial-access device 361 by directing the serial aggregator 320 to transmit the signal over the slot 'C' of the range of ports at the serial aggregator 320, which is known as being designated to link with the upper serial-access device 361 based on the topology schema.

In an exemplary embodiment, the signal contains instructions that install configuration settings within the upper serial-access device 361 to make it secure, accessible, and compliant with legal, operational, and fabric requirements. Once the upper serial-access device 361 is set up with configuration settings, the $TOR_1$ and $PDU_2$ are also configured. In one instance, the $TOR_1$ is indirectly configured by directing the upper serial-access device 361 to install configuration settings thereon using internal couplings within the rack 301. In another instance, $TOR_1$ is directly configured upon the configuration of software 311 directing the spine device 412 to send a signal via the slot 'A' of the range of ports at the spine device 412, which is known as being designated to link with the $TOR_1$ based on the topology schema. Further, the $PDU_2$ may be configured upon the upper serial-access device 361 sending a signal to install configuration settings over the slot 'E' of the range of ports known by the topology schema as being designated to link with $PDU_2$.

Upon configuring the devices of rack 301, the $TOR_1$ may be discovered and validated. In embodiments, discovery and validation involves sending a message to the upper serial-access device 361 that includes instructions for invoking the $TOR_1$ to send an outbound data packet. If the outbound data packet is received at the user device 310 via one or more of the spine devices 411 and 412, the configuration software 311 is able to confirm against the template file 312 that the upper serial-access device 361 and the $TOR_1$ are properly internally coupled at the expected slots specified by the topology schema.

The $PDU_2$ may be discovered and validated using the following workflow: instructing the upper serial-access device 361 to communicate with the $PDU_2$ over the expected slot 'E' of the range of ports designated to link with PDUs; instructing the $TOR_1$ to communicate with the $PDU_2$ over a slot 'F' in a port range allocated to link with PDUs, where the slot 'F' is expected to link with the $PDU_2$ based on the topology schema; and attempting to control a supply of power to an upper portion of the rack 301 (via the $PDU_2$) through commands invoked by the upper serial-access device 361 and the $TOR_1$, respectively. If the power supply is detected by the configuration software 311 as being properly invoked, the internal coupling (serial-based connection) between the upper serial-access device 361 and the $PDU_2$, as well as the internal coupling (network-based connection) between the $TOR_1$ and the $PDU_2$, are validated. Typically, the slots 'E' and 'F' are provisioned with enhanced security mechanisms and/or are assigned a higher priority level in comparison to other slots of the port ranges within the upper serial-access device 361 and the $TOR_1$, respectively.

The $BLADE_2$ may be discovered and validated by controlling the $PDU_2$ to selectively supply power thereto. In general, selectively supplying power involves the following workflow: instructing the upper serial-access device 361 to direct the $PDU_2$ to withhold power from each of the computing devices 371 and 372 residing within an upper portion of the rack 301; ensure no output is generated through serial and/or network connections for the TOR/serial devices to validate power has been removed; directing the $PDU_2$ to supply power to the $BLADE_2$ across a slot 'G' within a port range designated for linking with the computing devices 371 and 372, where topology schema expects the slot 'G' to internally couple the $PDU_2$ and the $BLADE_2$. This workflow of selectively supplying power causes the $BLADE_2$ to reboot (e.g., using a PXE boot) that triggers $BLADE_2$ to generate data packets.

These boot-generated data packets are aggregated at the $TOR_1$, which identifies the slot within the range of ports allocated for the computing devices 371 and 372 that receives the data packets. Indicia of the identified slot, an address of the $TOR_1$, and other pertinent information may be appended to content of the data packets and passed back to the user device 310. Upon receipt of the appended data packets at the user device 310, the configuration software 311 may read the content of the appended data packets and cross-reference information extracted from the appended data packets against the template file 312 to validate certain attributes of the $BLADE_2$. For instance, an address (e.g., MAC address) or identifier (e.g., serial code) of the $BLADE_2$ conveyed within the data packets may be compared against an expected address or identifier at the hardware schema in order to validate the expected location or expected identity, respectively, of the $BLADE_2$. In another instance, simply receiving the data packets from the $BLADE_2$ acts to confirm the internal coupling between the upper serial-access device 361, the $BLADE_2$, and the $PDU_2$. In yet another instance, information appended to the data packets confirms the internal coupling between the $BLADE_2$ and the $TOR_1$, as well as a location or identity of the $TOR_1$, upon cross-referencing the appended information against the hardware schema. Also, the data packet helps validate the serial connectivity by checking for the output from the blade over the expected serial connection to the blade.

If the data packets are not received by the user device 310 upon the configuration software 311 instructing the upper serial-access device 361 to direct the $PDU_2$ to invoke a reboot of the $BLADE_2$, the configuration software 311 may record the $BLADE_2$ as missing or non-responsive. Upon finding the discrepancy in the case above, the bootstrap process may be programmed with flexibility to automatically decide whether to proceed to the next phase of workflow within the current phase, or to interrupt the bootstrap process and/or to issue an alarm that notifies the technician to inspect the hardware inventory 360. The automatic decision may be based on the quality and quantity of the discrepancies occurring during the bootstrap process. In one example, if number of miswirings detected during validation overcomes a predefined threshold, the user device 310 may notify the technician to manually fix the wiring and repeat the validation with respect to $BLADE_2$. In another example, if the number of miswirings remains below the predefined threshold, the user device 310 may potentially move forward within the bootstrap process while issuing a warning to note the discrepancy. Thus, the automatic decision may help avoid stalling the bootstrap process for discrepancies of minor concern. Yet, those discrepancies detected that are of major concern, such as a missing upper serial-access device 361, may trigger the interruption of the bootstrap process even when the number of miswirings remains below the predefined threshold. Further, the configuration software 311 is designed to make a determination of whether an unexpected device is capable of replacing a device expected by the hardware schema, or whether a missing expected device should absolutely exist due to its high level of quality.

Further, if the data packets are received by the user device 310 but at unexpected ports upon the configuration software 311 reading contents of the data packets and cross-referencing information extracted from the data packets against the template file 312, the configuration software 311 may record the $BLADE_2$ as having inconsistencies in its wiring pattern. In this instance, the notification may be issued for a technician to check the wiring pattern surrounding $BLADE_2$ and to rerun the workflows for validating the $BLADE_2$ independently without reevaluating the entire rack 301.

During validation, the configuration software 311 may further glean from content of the data packets a configuration of devices within the rack 301. For example, content within the data packets may reveal that certain components provisioned within the $BLADE_2$ are associated with a particular level of security and are programmed with particular features. The level of security and/or the programmed features may be cross-referenced against the hardware schema in order to determine whether a configuration of the $BLADE_2$ is acceptable. If, for instance, the content of the data packets indicates that an absence of particular features from components of the $BLADE_2$ would cause an undesirable compromise to the level of security, these absent features may cause an alarm or trigger the configuration software 311 to reconfigure the $BLADE_2$.

In embodiments, the procedure of reconfiguring, or initially configuring blank devices, may be conducted during or after the discovery and validation phase of the bootstrap process. Initially, a driver development kit (DDK) may be provided that describes the interfaces of the network and hardware devices, which an original equipment manufacturer (OEM) may employ to implement drivers within network and hardware devices of the hardware inventory 360 prior to delivery. For example, the service provider of a data center may provide the OEM with the DDK, where the OEM is contracted to install drivers on the appropriate network and hardware devices according to the DDK. In operation, the implemented drivers facilitate interaction between the network and hardware devices and allow the configuration software 311 to control the serial-access devices 361 and 362 by sending instructions thereto.

These drivers, as well as other attributes of components, within the network and hardware devices may be inspected during the validation discovery phase. In embodiments, the inspection may identify a type of firmware and/or operating system (OS) installed on the network and hardware devices, if already presently installed. If the type of firmware and/or OS presently installed is inappropriate with respect to the template file 312, the reconfiguring procedure is invoked. In an exemplary embodiment, the reconfiguring procedure is carried out by implementing the following workflow: flushing out the presently installed firmware and/or OS; and deploying a maintenance OS, where the maintenance OS allows for a rapid install and ensures the appropriate drivers and components appear on the network and hardware devices in order to accomplish validation. Beyond the bootstrap workflow, the fabric may be responsible for replacing the maintenance OS with an operating OS for supporting services running within a data center. The operating OS is generally configured to meet cloud-computing regulations of the data center such that the hardware inventory 360 may be transparently integrated within a particular topology of a cloud-computing network. In one embodiment, the installation of the operating OS involves downloading an image that corresponds with attributes of the cloud-computing fabric running within the data center in which the hardware inventory 360 is scheduled to be deployed.

Architecture of a Bootstrap Ecosystem

Figure 5:
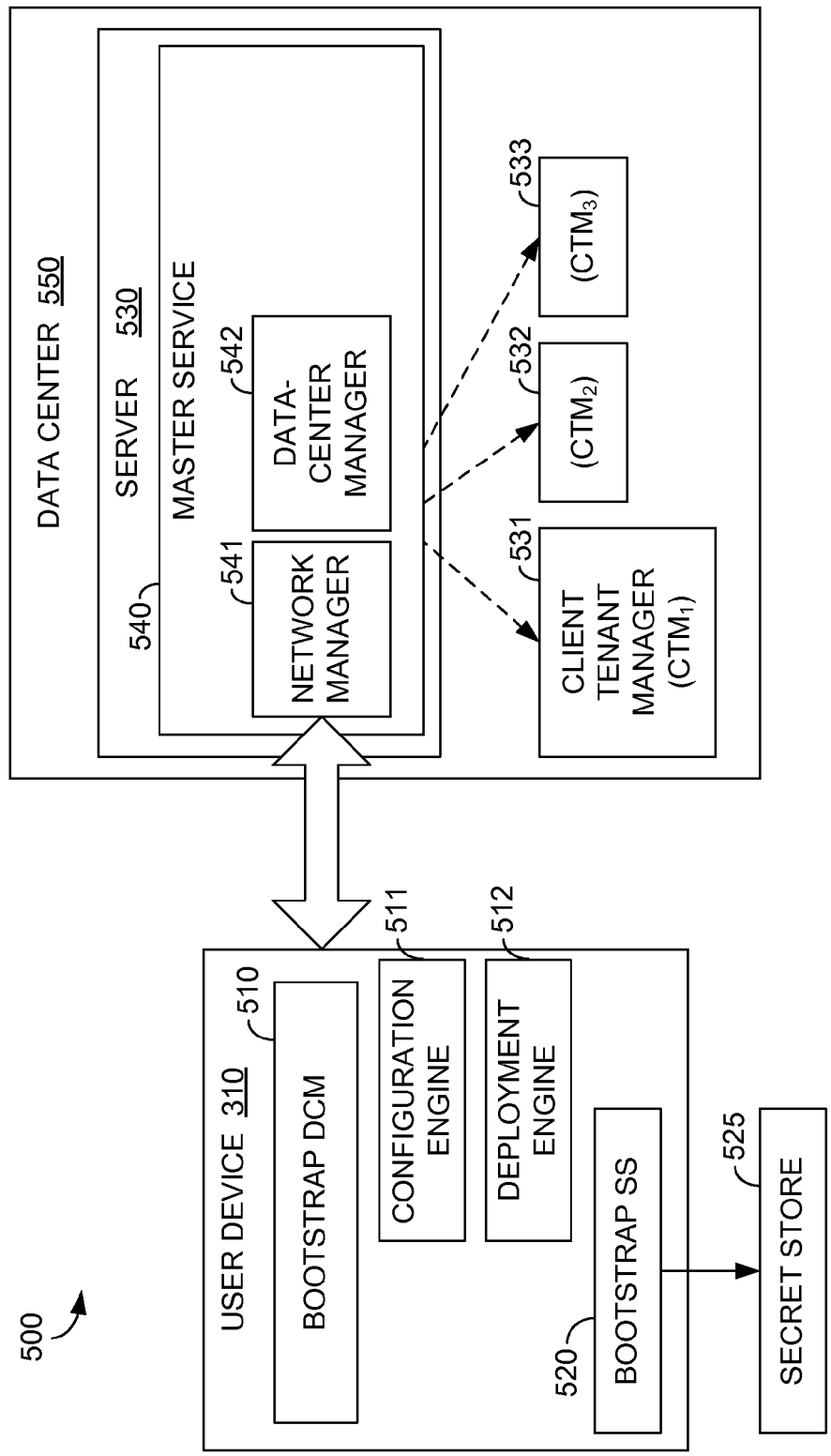
FIG. 5 is a graphical representation illustrating an exemplary bootstrap ecosystem for integrating and deploying the hardware inventory within a cloud-computing fabric of a data center, the bootstrap ecosystem being suitable for use in implementing embodiments of the present invention.

Turning now to FIG. 5, an architecture and bootstrap-process phase for deploying and integrating the hardware inventory 360 of FIGS. 3 and 4 (see reference numeral 240 of FIG. 2) will now be discussed. Generally, FIG. 5 shows a graphical representation illustrating an exemplary bootstrap ecosystem 500 for integrating and deploying a hardware inventory within a cloud-computing fabric of a data center 550, the bootstrap ecosystem 500 being suitable for use in implementing embodiments of the present invention.

Initially, upon installing configuration settings and the operating OS to the network and hardware devices, as discussed more fully above, an infrastructure state is prepared from information retrieved within content of the data packets collected when verifying the physical topology of the hardware inventory 360 of FIG. 3. As used herein, the phrase "infrastructure state" is meant to broadly encompass any data that is useful to describe hardware and/or software properties presently exhibited by the network and hardware devices. In one particular example, the infrastructure state helps identify the utility of the hardware inventory as storage, compute, or hybrid of storage and compute, where the utility is based on such considerations as physical topology (e.g., high-profile blades are linked to ports with proper permissions for high-security storage purposes), configuration settings, and identity of the network and hardware devices. As such, infrastructure state ostensibly serves as an image of the software, configuration settings, and operating OS installed within the hardware inventory when it is built out to an FCC stamp.

In operation, the infrastructure state is shared by the user device 310 with one or more components of the data center 550 when integrating the hardware inventory within the cloud-computing fabric. In this way, the infrastructure state acts as an input that includes details of the hardware inventory that enable a fabric controller to manage the hardware inventory as an FCC instance or cloud-computing stamp. For example, details may include MAC or IP addresses and configurations of the network and hardware devices, locations of particular devices, port connections between devices and PDUs, and other information needed to manage the FCC stamp.

In one embodiment, the user device 310 is provisioned with a variety of software to implement the deployment and integration phase. This software includes a bootstrap data-center manager (DCM) 510, a configuration engine 511, a deployment engine 512, and a bootstrap secret store (SS) 520 that communicates with the secret store 525 residing in a secure location. The bootstrap DCM 510 presents a portion of the fabric controller, which is capable of managing network and hardware devices, that drives the workflow of the deployment and integration phase. In one instance, the bootstrap DCM 510 effectively manages the addition and removal of built-out hardware inventory, or "FCC instance," within the data center 550. Management typically includes the deployment/scaling out of one or more fabrics (e.g., master and client).

Managing the addition of the FCC instance may involve the following workflow: provide an interface between the bootstrap DCM 510 of the user device 310 and a DCM 542 within a server 530 within the data center 550; copying the infrastructure state (e.g., rack-level information) of the FCC instance from the bootstrap DCM 510 to the DCM 542 using the interface; and bestowing on a network manager 541 the ability to selfgovern the FCC instance using the recently shared infrastructure state. It should be noted that the master service 540 may be deployed on multiple servers, and is not limited to the single-device implementation of the server 530. As illustrated in FIG. 5, the network manager 541 and the DCM 542 may comprise a master service 540, which is responsible for incorporating new FCC instances within the cloud-computing fabric, along with other components such as a fabric controller, backup service, warehouse, etc.

In addition to sharing the infrastructure state of the FCC instance, the bootstrap ecosystem 500 is designed, in embodiments, to deploy services of the cloud-computing fabric onto the FCC instance. These services may include core tenants, infrastructure tenants, and/or platform tenants. In one instance, core tenants represent critical services that enable general functionality of the cloud-computing fabric, support inter-node communication (e.g., domain name server (DNS) capabilities) within the data center 550, and manage storage operations. The infrastructure tenants represent usability and availability services, for example, that enable cloud-computing stamps to efficiently manage a customer's service application distributively hosted within the data center 550. Examples of infrastructure tenants include storage location services that support finding the customer's data on remotely located accounts and front-end APIs that provide an interface for the customer to interact with the CTMs 531-533. The platform tenants typically represent services that are offered to the customers as options (e.g., cloud-to-premise access for linking between the data center 550 and a private enterprise network). As such, the platform tenants are not necessarily required for operation of the data center 550 but should match the definitions of the infrastructure state.

During deployment of the tenants upon the FCC stamp, the configuration engine 511 and the deployment engine 512 may lend their involvement. Initially, the deployment engine 512 may be called to initiate the deployment. In general, the deployment engine 512 is responsible for driving end-to-end automation of the deployment and integration phase of the bootstrap process including the execution of tools and mechanisms used to accomplish the workflow inherent within the phase. For example, the workflow may involve scheduling deployments of various hardware inventories built out into FCC instances, managing deployments that are presently in-flight, reporting on progress of the deployment, and responding to any interference issues that occur. Often, the deployment engine 512 executes the deployments against a live cloud-computing fabric such that the deployment engine 512 is capable of escalating issues concerning the live fabric and collecting metrics that are usable to implement deployment improvements over time.

The configuration engine 511 is responsible for interfacing with the data center 550 to configure and update the master service 540 upon deployment, thereby integrating the FCC stamp within the cloud-computing fabric. In one instance of integrating, the configuration engine 511 records an initial configuration of a hardware inventory, detects changes to the configuration when building out the hardware inventory into an FCC stamp, and provides a history of the changes to the configuration of the FCC stamp. Generally, this history of changes is employed to indicate impacts of the reconfiguration procedure and provide assurance that compliance standards are met. In this way, the history of changes can expose any conflicts or potential missing parameters that occurred during configuration changes to the FCC stamp. Accordingly, the FCC stamp may act as a repository for core, infrastructure, and platform tenants' configurations.

In embodiments, the customer driving the request for additional storage/computing capacity (being fulfilled by the FCC stamp) may also provide a dependency schema that outlines the criteria to be satisfied by the FCC stamp in order to properly run the customer's service application(s). In operation, the dependency schema may be compared against the infrastructure state and the history of changes in configuration to ensure that the FCC instance is built out in such a manner that the prerequisites specified by the customer are met. Thus, when the dependency schema is satisfied by the known attributes of the FCC instance, the FCC may be released to begin hosting the customer's service applications.

Although various different attributes (e.g., infrastructure state and the history of changes in configuration) of the FCC instance utilized to check functionality against the customer's dependency schema have been described, it should be understood and appreciated that other types of suitable information may be passed between the bootstrap DCM 510 and the DCM 542 during deployment, and that embodiments of the present invention are not limited to the particular articles of information described herein. For instance, an overall size of the FCC instance (e.g., number of nodes) and/or a location of entry points (e.g., ways to connect to the FCC instance) may be relayed from the bootstrap DCM 510 to the DCM 542. In another instance of functionality checking, minimal discovery and validation is conducted to identify enough inventory to deploy the master service 540 and then leverage the DCM 542 to drive the discovery, validation, and configuration of the remaining hardware in the FCC instance. In yet another instance of functionality checking, an existing DCM instance is used to drive the discovery, validation, and configuration of the hardware with appropriate security and isolation for live inventory.

During deployment of the FCC stamp, the secret store 525 may be accessed to provide confidential information generated when building out the hardware inventory 360 of FIG. 3 into the FCC stamp. As used herein, the phrase "secret store" generally refers to a stand-alone mechanism that interfaces with the bootstrap SS 520 typically running on the user device 310. In this way, the secret store 525 does not have any dependency on the Internet or other publicly accessible network, thereby preserving the private nature of the confidential information stored within the secret store 525. In some embodiments, the secret store may represent a centrally secured secret storage location that is accessed over the Internet.

Prior to deployment of the FCC stamp, the secret store 525 employs a management API to manage confidential information generated on-the-fly while building out the hardware inventory during the initial bootstrap-process phases. This confidential information (e.g., credentials for network and hardware devices, original certificates, private keys, passwords for serial-access devices, and other permissions) is continuously written to the secret store 525 until the completion of the discovery and validation phase, and including the reconfiguration procedure if necessary. During deployment, the secret store 525 may automatically transfer some confidential information to the bootstrap SS 520 to export to the master service 540, and may transfer other confidential information to a highly-available location for viewing by a custodian of the data center 550. This confidential information may be subsequently used by the custodian to debug the FCC instance upon experiencing problems when integrated within the data center 550.

Upon successfully completing deployment, and prior to a cluster-wide validation phase of the bootstrap process, the FCC instance may be integrated within the data center 550. Further deployments of the CTMs 531-533 in FIG. 5 can commence upon the deployment completion, and validation of the master service 540.

Integration may also include replacing locally generated credentials (used to access network and hardware devices) employed during the build-out of the hardware inventory with new secure credentials. In one instance, replacement of the credentials is performed by leveraging existing cloud-computing fabric processes for creating, auditing, and rotating security tokens on existing nodes. In this way, build-out credentials that may have been shared with various parties (e.g., technicians, OEMs, curators, or administrators) while building out the hardware inventory are decommissioned, thus, the FCC stamp is made more secure. It should be noted that, even upon integration, the user device 310 may be retained as a gateway device to service the fabric instances (e.g., master and client) after the bootstrap process is complete.

The phase of cluster-wide validation is commenced upon successfully completing the deployment and integration phase. In embodiments, successful completion entails ensuring that each prerequisite of the deployment and integration phase is such that a resultant output of the deployment and integration phase leave the FCC instance in condition for the next phase to pick up without difficulty. For example, if the resultant output of the deployment and integration phase does not allow sufficient access to the FCC instance by operators (i.e., a prerequisite of the deployment and integration phase), then there exists an issue to be remediated prior to progressing to the next phase. In this way, the deployment and integration phase, as well as the other bootstrap-process phases, include a step in their respective workflows that self-evaluates output(s) resulting from a sum of operations executed during phases. The self-evaluation may cause workflow steps to be repeated or may designate a particular phase as being successfully completed, thereby allowing a subsequent phase to commence.

Beyond the self-evaluations internal to the respective phases, the cluster-wide validation phase (see reference numeral 250 of FIG. 2) is performed in order to ensure the FCC instance is ready for use. In embodiments, cluster-wide validation includes carrying out a suite of tests that may be automatically run or may involve manual assistance via a test harness. The suite of tests may be conducted against various systems from various locations. For instance, the suite of tests may involve directing the master service 540 to verify whether the FCC instance is internally reachable via the $CTM_1$. In another instance, the suite of tests may involve directing external entities (e.g., corporate network over the Ethernet or specialized entities requested by the customers) to verify whether the FCC instance is externally reachable.

It should be noted that the exemplary system architecture of the bootstrap ecosystem 500 is but one example of a suitable environment that may be implemented to carry out aspects of the present invention and is not intended to suggest any limitation as to the scope of use or functionality of the invention. Neither should the illustrated bootstrap ecosystem 500 be interpreted as having any dependency or requirement relating to any one or combination of the components 510-512, 520, 541, 542, and 531-533 as illustrated. In some embodiments, one or more of the components 510-512, 520, 541, 542, and 531-533 may be implemented as stand-alone devices, similar to the secret store 525, or as services or executable(s). In other embodiments, one or more of the components 510-512, 520, 541, 542, and 531-533 may be integrated directly into the computing server 530 and/or the user device 310. It will be understood by those of ordinary skill in the art that the components 510-512, 520, 541, 542, and 531-533 illustrated in FIG. 5 are exemplary in nature and in number and should not be construed as limiting. It should be noted that deployment may be carried out without any of the specific components listed above, but with replacement processes that provide similar functions.

Accordingly, any number of components may be employed to achieve the desired functionality within the scope of embodiments of the present invention. Although the various components of FIG. 5 are shown with lines for the sake of clarity, in reality, delineating various components is not so clear, and metaphorically, the lines would more accurately be grey or fuzzy. Further, although some components of FIG. 5 are depicted as single blocks, the depictions are exemplary in nature and in number and are not to be construed as limiting (e.g., although only one DCM 542 is shown, many more may be communicatively coupled to other user devices that are performing the bootstrap process on other hardware inventories).

Further, the server 530 can be any type of computing device(s), such as, for example, computing device 100 described above with reference to FIG. 1. By way of example only, and not limitation, the server 530, can be a personal computer, a desktop computer, a laptop computer, a handheld device, a mobile handset, consumer electronic device, and the like. In embodiments, data center 550 may include any number of the physical resources listed above, and may include any collection of computing devices, or other machines capable of executing customer's service applications in a distributed fashion.

Additionally, other device(s) of the physical resources listed above may host the master service 540, which is shown as residing on the server 550. These other device(s) may manage the operations of the master service 540 via wired or wireless network paths through the data center 550. It should be noted, however, that embodiments of the present invention are not limited to implementation on such physical resources illustrated in FIG. 5 but may be implemented on any of a variety of different types of computing devices and equipment within the scope of embodiments hereof. In other words, illustrated resources of the data center 550 depict an exemplary configuration that is intended for discussion purposes only; accordingly, any suitable layout of resources known in the computing industry may be used and is contemplated by the present invention.

Process Flows

Figure 6:
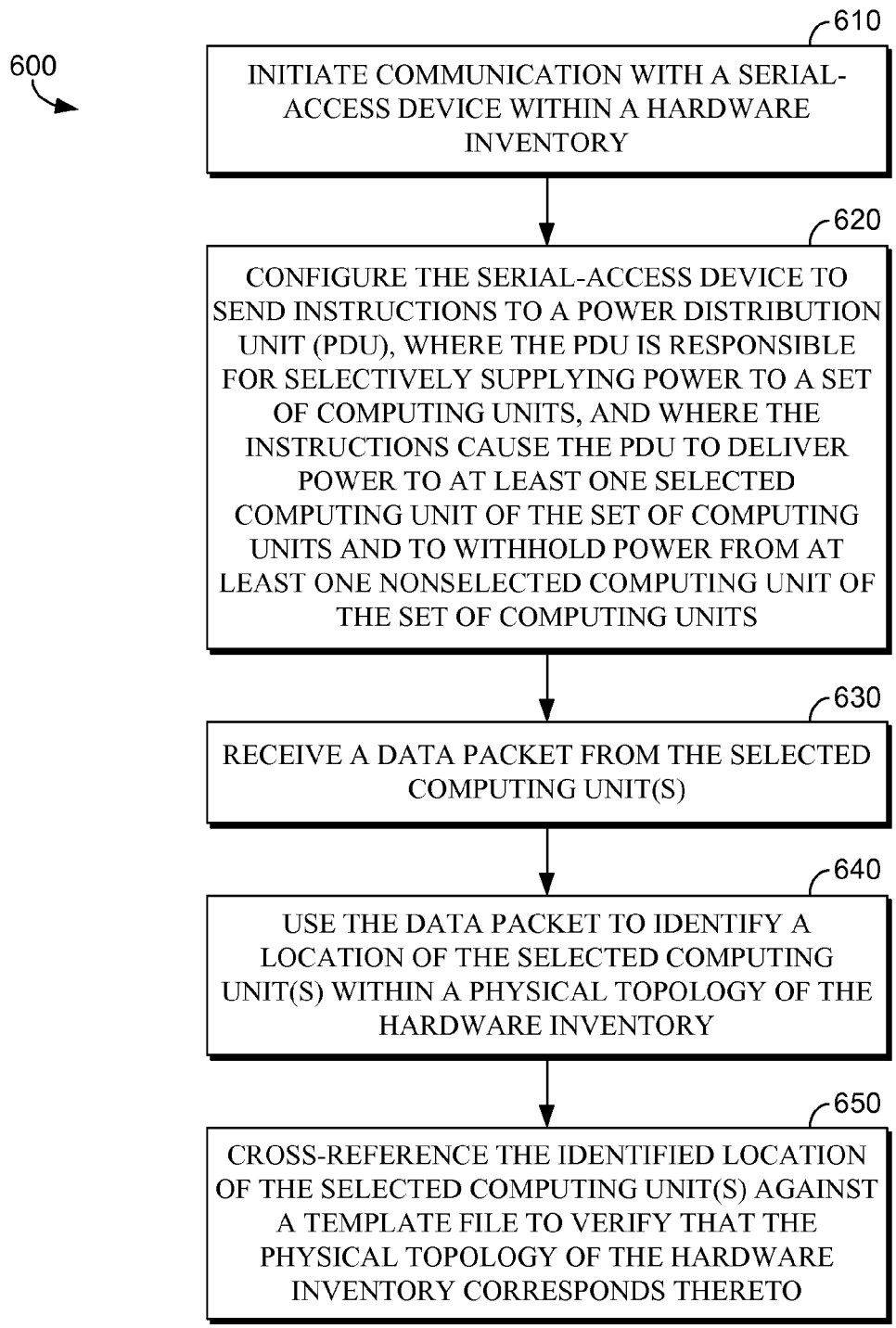
FIG. 6 is a flow diagram showing an overall method for discovering and validating an inventory of hardware being incorporated within a topology of a data center, in accordance with an embodiment of the present invention.

Referring now to FIG. 6, a flow diagram is shown that illustrates an overall method 600 for discovering and validating an inventory of hardware, in accordance with an embodiment of the present invention. Although the terms "step" and/or "block" may be used herein to connote different elements of methods employed, the terms should not be interpreted as implying any particular order among or between various steps herein disclosed unless and except when the order of individual steps is explicitly described. Initially, the hardware inventory represents a rack, where the rack may include a network device (e.g., top-of-rack switch and serial-access device) and a set of computing units (e.g., set of blades inserted into the rack). The set of blades are typically interconnected between the serial-access device and the TOR switch.

The method 600, as depicted at block 610, may involve initiating communication between a user device and the serial-access device or a secondary network-access device (if the out-of-band device is a secondary network switch rather than a serial device) within the hardware inventory. In one instance, the communication to the serial-access device is initiated by the user device over a serial-based connection. The method 600 may further involve configuring the serial-access device to send instructions to the PDU, as depicted at block 620. As discussed more fully above, the PDU is generally responsible for selectively supplying power to a set of computing units. Accordingly, upon receiving the instructions from the serial-access device, the instructions cause the PDU to deliver power to at least one selected computing unit of the set of computing units and to withhold power from at least one nonselected computing unit of the set of computing units. Eventually, at least one data packet may be received at the user device from the selected computing unit(s), as depicted at block 630. Typically, the data packet is received at the user device via a network-based connection with the top-of-rack switch (TOR) that is enabled to detect the data packet that originates from the selected computing unit(s). In one embodiment, the network device is configured to identify a port at which the data packet is detected and to append an indicia of the identified port to the data packet. Consequently, when using the data packet to identify a location of the selected computing unit(s), the user device may read and record the identified port carried within a payload of the data packet. Further, the user device may identify the location of the selected computing unit(s) by reading and recording an Internet protocol (IP) address or a media access control (MAC) address carried within a header of the data packet. This identified location of the selected computing unit(s) may be employed to understand, in part, an arrangement of a physical topology of the hardware inventory, as depicted at block 640.

In an exemplary embodiment, as depicted at block 650, the method 600 may include cross-referencing the identified location of the selected computing unit(s) against a template file to verify that the physical topology of the hardware inventory is comparable against the template file. Generally, the template file may include a topology schema and/or a hardware schema. Generally, the topology schema specifies an expected location of the selected computing unit(s) and is employed by the user device to verify that the hardware inventory is properly wired. On the other hand, the hardware schema is generally employed to specify which components are expected to reside within the selected computing unit(s). Further, the hardware schema may be employed by a user device to verify an internal configuration of the computing unit(s).

Upon the user device verifying that the location of the selected computing unit(s) is consistent with the template file, the user device may send a signal to the serial-access device over the serial-based connection that invokes installing confirmation settings on the selected computing unit(s). Also, the user device may watch the outputs of the serial-access device to verify serial connectivity. Further, upon the user device verifying the physical topology of the hardware inventory, the user device may prepare an infrastructure state from information gathered during the discovery and validation phases of the bootstrap process. During the integration and deployment phases of the bootstrap process, the user device may share the infrastructure state with a controller of a cloud-computing fabric in order to facilitate integrating the hardware inventory within the fabric of a data center. Also, the user device may trigger the deployment of services running on the fabric at the hardware inventory, thereby designating the hardware inventory as an FCC of the fabric. By designating the hardware inventory as the FCC, the fabric controller is allowed to manage and locate the hardware inventory within the context of the data center.

Figure 7:
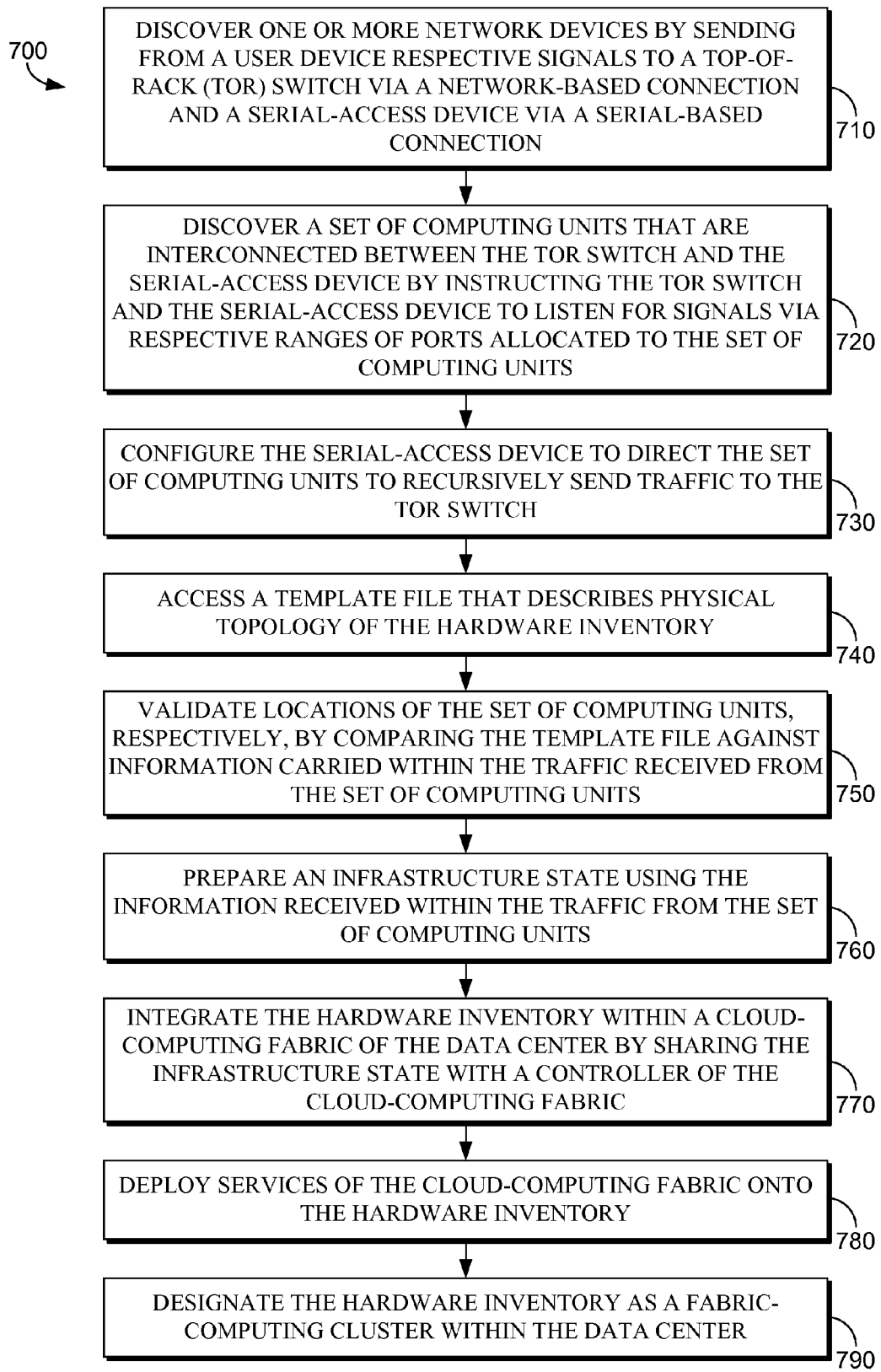
FIG. 7 is a flow diagram showing an overall method for deployment of a fabric instance upon building out a new inventory of hardware to a fabric-computing cluster (FCC) of a data center or for addition of discovered and validated new/re-purposed hardware inventory upon expansion of an existing FCC stamp within a data center, in accordance with an embodiment of the present invention.

Turning now to FIG. 7, a flow diagram is shown illustrating an overall method 700 for building out an inventory of hardware to a fabric-computing cluster (FCC) of a data center, in accordance with an embodiment of the present invention. The method 700 includes discovering network device(s) by sending from a user device respective signals to a top-of-rack (TOR) switch via a network-based connection and to a serial-access device via a serial-based connection, as depicted at block 710. A set of computing units, which are interconnected between the TOR switch and the serial-access device, may be discovered by instructing the TOR switch and the serial-access device to listen for signals (e.g., the configuration software 311 of FIG. 3 311 queries the TOR switches/serial devices to retrieve the required information) via respective ranges of ports allocated to the set of computing units, as depicted at block 720.

The method 700 may further involve configuring the serial-access device to direct the set of computing units to recursively send traffic to the TOR switch, as depicted at block 730. As depicted at block 740, a template file that describes physical topology of the hardware inventory may be accessed from a remote data store or from local memory of a user device. Locations of the set of computing units may be respectively validated by comparing the template file against information carried within the traffic received from the set of computing units, as depicted at block 750. An infrastructure state may be prepared, as depicted at block 760, using the information received within the traffic from the set of computing units. As depicted at block 770, the hardware inventory may be integrated within a cloud-computing fabric of the data center by sharing the infrastructure state with a controller of the cloud-computing fabric. Concurrently with integration or at some later point, services running on the cloud-computing fabric may be deployed onto the hardware inventory (see block 780) and the hardware inventory may be designated as an FCC within the data center at block 790. In instances, validation is performed prior to designating the hardware inventory as an FCC stamp to ensure it is properly deployed/configured.

Embodiments of the present invention have been described in relation to particular embodiments, which are intended in all respects to be illustrative rather than restrictive. Alternative embodiments will become apparent to those of ordinary skill in the art to which embodiments of the present invention pertain without departing from its scope.

From the foregoing, it will be seen that this invention is one well adapted to attain all the ends and objects set forth above, together with other advantages, which are obvious and inherent to the system and method. It will be understood that certain features and subcombinations are of utility and may be employed without reference to other features and subcombinations. This is contemplated by and is within the scope of the claims.

What is claimed is:

1. One or more computer-readable hardware memory having computer-executable instructions embodied thereon that, when executed, perform a method for discovering and validating an inventory of hardware, the method comprising:
   initiating, using a user device of a verification ecosystem, the verification ecosystem comprising the user device having a template file and the hardware inventory, communication with a serial-access device within the hardware inventory or network switch device residing on a secondary out-of-band network within the hardware inventory, wherein the communication triggers intercommunication between the user device and the hardware inventory, the intercommunication excludes an existing infrastructure, wherein the intercommunication for discovery and validation of the hardware inventory is performed based at least in part on a security boundary that serves as a virtual layer that isolates and securely separates the existing infrastructure from the hardware inventory;
   configuring the serial-access device to send instructions to a power distribution unit (PDU), wherein the PDU is responsible for selectively supplying power to a set of computing units, and wherein the instructions cause the PDU to deliver power to at least one selected computing unit of the set of computing units and to withhold power from at least one nonselected computing unit of the set of computing units;
   receiving a data packet from the at least one selected computing unit;
   using the data packet to identify a location of the at least one selected computing unit within a physical topology of the hardware inventory; and
   cross-referencing the identified location, address and internal wiring of the at least one selected computing unit against the template file having an expected location, address, and internal wiring, to verify that the physical topology of the hardware inventory corresponds thereto.

2. The computer-readable hardware memory of claim 1, wherein the data packet is received at a user device via a network-based connection with a network device that is enabled to detect the data packet that originates from the at least one selected computing unit, wherein the method further comprises interrogating the network device for information related to processed traffic.

3. The computer-readable hardware memory of claim 2, wherein the communication to the serial-access device is initiated by the user device over a serial-based connection, wherein the serial-access device is initially accessed based on a default set of credentials from a vendor of the hardware inventory, the default set of credentials programmed into a hardware schema in the template file.

4. The computer-readable hardware memory of claim 2, wherein the network device is configured to either identify a port at which the data packet is detected and to append an indicia of the identified port to the data packet or retrieve new active locations at which data packets are being transmitted.

5. The computer-readable hardware memory of claim 4, wherein using the data packet to identify a location of the at least one selected computing unit comprises reading the identified port carried within a payload of the data packet.

6. The computer-readable hardware memory of claim 1, further comprising:
 identifying components associated with the at least one selected computing units based on the information in data packets;
 determining configuration settings applied to the components based on the information;
 comparing the configuration settings against expected configuration settings maintained within a hardware schema of the template file;
 when the configuration settings do not correspond to the expected configuration settings, performing a reconfiguration via at least the serial-access device.

7. The computer-readable hardware memory of claim 1, wherein the template file includes a topology schema that specifies an expected location of the at least one selected computing unit, and wherein the topology schema is employed by a user device to verify the hardware inventory is properly wired, and wherein the topology schema comprises at least one of wiring rules, device configuration, or device locations.

8. The computer-readable hardware memory of claim 1, wherein the template file includes a hardware schema that specifies which components are expected to reside within the at least one selected computing unit, and wherein the hardware schema is employed by a user device to verify an internal configuration of the at least one computing unit.

9. The computer-readable hardware memory of claim 3, wherein the method further comprises:
 sending a signal from the user device to the serial-access device over the serial-based connection that, upon verifying the location of the at least one selected computing unit is consistent with the template file, invokes installing confirmation settings on the at least one selected computing unit; and
 updating.

10. The computer-readable hardware memory of claim 9, wherein the method further comprises preparing an infrastructure state from information gathered upon verifying the physical topology of the hardware inventory.

11. The computer-readable hardware memory of claim 10, wherein the method further comprises:
 sharing the infrastructure state with a controller of a cloud-computing fabric;
 deploying services of a cloud-computing fabric onto the hardware inventory; and
 designating the hardware inventory as a fabric-computing cluster.

12. The computer-readable hardware memory of claim 1, further comprising:
 determining actual values for one or more symbolic representation indicating preliminary values in the template file;
 replacing preliminary values of the one or more symbolic representations in the template file to actual values mined from the delivered hardware inventory; and
 providing the template file having the actual values for subsequent phases of a bootstrap process.

13. A computerized method for building out an inventory of hardware to a fabric-computing cluster (FCC) of a data center, the method comprising:
 discovering, using a user device of a verification ecosystem, one or more network devices by sending from the user device respective signals to a top-of-rack (TOR) switch via a network-based connection and a serial-access device via a serial-based connection, the verification ecosystem comprising the user device having a template file and the hardware inventory, wherein the respective signals triggers intercommunication between the user device and the hardware inventory, the intercommunication excludes an existing infrastructure, wherein the intercommunication for discovery and validation of the hardware inventory is performed based at least in part on a security boundary that serves as a virtual layer that isolates and securely separates the existing infrastructure from the hardware inventory;
 discovering a set of computing units that are interconnected between the TOR switch and the serial-access device by instructing the TOR switch and the serial-access device to listen for signals via respective ranges of ports allocated to the set of computing units, wherein the set of computing units are selectively supplied power based on instructions from the serial-access device to a power distribution unit (PDU);
 configuring the serial-access device to direct the set of computing units to recursively send traffic to the TOR switch;
 accessing the template file that describes physical topology of the hardware inventory, wherein the template file includes a topology schema that defines internal wiring associated with the set of computing units and the ranges of ports allocated to the set of computing units, and wherein the template file includes a hardware schema that defines components within the set of computing units and internal configuration of the set of computing units;
 validating locations, addresses, internal wiring, components, and internal configuration of the set of computing units, respectively, by comparing the template file against information carried within the traffic received from the set of computing units, the information indicating the location, addresses, internal wiring, components, and internal configuration of the set of computing units;
 preparing an infrastructure state using the information received within the traffic from the set of computing units;
 integrating the hardware inventory within a cloud-computing fabric of the data center by sharing the infrastructure state with a controller of the cloud-computing fabric;
 deploying services of the cloud-computing fabric onto the hardware inventory; and
 designating the hardware inventory as the FCC within the data center.

14. A computer system for performing a method that automatically incorporates one or more computing units within a cloud-computing fabric of a data center, the computer system comprising:
  a rack;
  a plurality of network devices residing within the rack, wherein the plurality of network devices comprise:
  (a) a top-of-rack (TOR) switch for sending data packets over a network-based connection; and
  (b) a serial-access device for invoking generation of the data packets upon receiving instructions over a serial-based connection;
  a set of blades inserted within the rack, wherein the set of blades include the one or more computing units that are configured to individually generate data packets upon respectively receiving power;
  a power distribution unit (PDU) for selectively supplying power to the set of blades;
  a user device of a verification ecosystem, the user device having a template file, the user device that is communicatively coupled to the TOR switch via the network-based connection and to the serial-access device via the serial-based connection, wherein the user device is configured to perform a bootstrap process that comprises:
  (a) discovering the network devices and the set of blades; and
  (b) validating a location, address, internal wiring, components, and internal configuration of the set of blades by comparing information carried within the data packets against the template file that describes a physical topology of the rack, wherein discovery and validation intercommunication of the user device excludes an existing infrastructure, wherein the intercommunication for discovery and validation of a hardware inventory of the verification ecosystem is performed based at least in part on a security boundary that serves as a virtual layer that isolates and securely separates the existing infrastructure from the hardware inventory.

15. The computer system of claim 14, wherein the serial-access device is further configured to receive the instructions from the user device and to control the PDU by conveying the instructions thereto, wherein the serial-access device is initially accessed based on a default set of credentials from a vendor of the hardware inventory, the default set of credentials programmed into a hardware schema in a template file.

16. The computer system of claim 15, wherein the PDU is further configured to read the instructions and, based upon the instructions, deliver power to at least one selected blade of the set of blades and to withhold power from at least one nonselected blade of the set of blades.

17. The computer system of claim 16, wherein the bootstrap process performed by the user device further comprises:
  extracting the information carried within the data packets received from the set of blades, respectively;
  using the information to construct an infrastructure state.

18. The computer system of claim 17, further comprising a server for consuming the infrastructure state upon being conveyed from the user device, wherein one or more servers is configured for managing the cloud-computing fabric running on top of the data center.

19. The computer system of claim 18, wherein the server is further configured for deploying services of the cloud-computing fabric onto the set of blades and the network devices.

20. The computer system of claim 19, wherein the user device is further configured to install configuration settings onto the set of blades, wherein parameters of the configuration settings are described within the infrastructure state.

* * * * *